US 9,858,958 B2

(12) United States Patent
Hetzler et al.

(10) Patent No.: US 9,858,958 B2
(45) Date of Patent: *Jan. 2, 2018

(54) HIGH DENSITY HYBRID STORAGE SYSTEM

(71) Applicant: International Business Machines Corporation, Armonk, NY (US)

(72) Inventors: Steven R. Hetzler, Los Altos, CA (US); Gary M. McClelland, Palo Alto, CA (US); Robert M. Rees, Los Gatos, CA (US)

(73) Assignee: International Business Machines Corporation, Armonk, NY (US)

( * ) Notice: Subject to any disclaimer, the term of this patent is extended or adjusted under 35 U.S.C. 154(b) by 58 days.

This patent is subject to a terminal disclaimer.

(21) Appl. No.: 14/855,294

(22) Filed: Sep. 15, 2015

(65) Prior Publication Data

US 2016/0005432 A1    Jan. 7, 2016

Related U.S. Application Data

(63) Continuation of application No. 13/754,714, filed on Jan. 30, 2013, now Pat. No. 9,263,082.

(51) Int. Cl.
| | | |
|---|---|---|
| G11B 15/68 | (2006.01) | |
| G11B 23/037 | (2006.01) | |
| B65G 1/137 | (2006.01) | |

(52) U.S. Cl.
CPC .............. *G11B 15/68* (2013.01); *B65G 1/137* (2013.01); *G11B 15/6835* (2013.01); *G11B 15/6895* (2013.01); *G11B 23/037* (2013.01)

(58) Field of Classification Search
None
See application file for complete search history.

(56) References Cited

U.S. PATENT DOCUMENTS

| 3,715,040 A | 2/1973 | Polus et al. |
| 4,432,508 A | 2/1984 | Inoue et al. |

(Continued)

FOREIGN PATENT DOCUMENTS

| EP | 0558252 A1 | 9/1993 |
| JP | S5933660 A | 2/1984 |

(Continued)

OTHER PUBLICATIONS

Notice of Allowance from U.S. Appl. No. 13/754,714, dated Sep. 16, 2015.

(Continued)

*Primary Examiner* — Kevin Verbrugge
(74) *Attorney, Agent, or Firm* — Zilka-Kotab, P.C.

(57) ABSTRACT

A computer-implemented method includes receiving a request for data; determining whether the data is stored in a linear storage media tier and/or in a second storage tier having higher performance than the linear storage media tier. The linear storage media tier includes: reels having linear media thereon, a rest area for storing the reels when not in use, linear media drive(s) configured for reading and/or writing the linear media, and mobile robot(s) for transporting the linear storage media between the rest area and the linear media drive(s). The method also includes instructing the mobile robot to transport one of the reels having the data thereon to one of the linear media drives in the linear storage media tier when the data is stored in the linear storage media tier; receiving the data from the one of the linear media drives; and sending the data.

20 Claims, 17 Drawing Sheets

(56) References Cited

U.S. PATENT DOCUMENTS

| | | |
|---|---|---|
| 4,864,511 A | 9/1989 | Moy et al. |
| 4,928,245 A | 5/1990 | Moy et al. |
| 4,932,826 A | 6/1990 | Moy et al. |
| 4,989,191 A | 1/1991 | Kuo |
| 5,081,548 A | 1/1992 | Inazawa et al. |
| 5,150,452 A | 9/1992 | Pollack et al. |
| 5,155,639 A | 10/1992 | Platter et al. |
| 5,214,768 A | 5/1993 | Martin et al. |
| 5,333,810 A | 8/1994 | Hoge et al. |
| 5,367,410 A | 11/1994 | McCarthy |
| 5,395,199 A | 3/1995 | Day, III et al. |
| 5,412,791 A | 5/1995 | Martin et al. |
| 5,504,873 A | 4/1996 | Martin et al. |
| 5,557,770 A | 9/1996 | Bhide et al. |
| 5,906,324 A | 5/1999 | Adams et al. |
| 5,956,301 A | 9/1999 | Dimitri et al. |
| 6,198,593 B1 | 3/2001 | Hori et al. |
| 6,260,006 B1 | 7/2001 | Wong et al. |
| 6,421,579 B1 | 7/2002 | Dimitri et al. |
| 6,438,459 B1 | 8/2002 | Dimitri et al. |
| 6,718,228 B2 | 4/2004 | Campbell et al. |
| 6,808,353 B2 | 10/2004 | Ostwald et al. |
| 6,856,985 B1 | 2/2005 | Pierce et al. |
| 6,868,049 B2 | 3/2005 | Ostwald et al. |
| 7,039,657 B1 | 5/2006 | Bish et al. |
| 7,546,180 B1 | 6/2009 | Ries et al. |
| 8,019,455 B2 | 9/2011 | Maenishi et al. |
| 8,065,033 B2 | 11/2011 | Hoshino |
| 8,108,065 B2 | 1/2012 | Greco et al. |
| 8,159,776 B2 | 4/2012 | Fujita et al. |
| 8,198,593 B2 | 6/2012 | Kito et al. |
| 8,244,403 B2 | 8/2012 | Lin et al. |
| 8,494,674 B2 | 7/2013 | McClelland |
| 8,509,946 B2 | 8/2013 | McClelland |
| 8,666,535 B2 | 3/2014 | McClelland |
| 8,862,265 B2 | 10/2014 | McClelland |
| 9,263,082 B2 | 2/2016 | Hetzler et al. |
| 9,418,696 B2 | 8/2016 | McClelland |
| 2002/0062167 A1 | 5/2002 | Dimitri et al. |
| 2002/0087783 A1 | 7/2002 | Leonhardt et al. |
| 2003/0016465 A1 | 1/2003 | Bui et al. |
| 2003/0063966 A1 | 4/2003 | Apple et al. |
| 2004/0149850 A1 | 8/2004 | Nejezchleb et al. |
| 2005/0256999 A1 | 11/2005 | Kishi et al. |
| 2007/0266203 A1 | 11/2007 | Amano et al. |
| 2008/0201012 A1 | 8/2008 | Hoshino |
| 2009/0177314 A1 | 7/2009 | Greco et al. |
| 2010/0030378 A1 | 2/2010 | Choi et al. |
| 2010/0042247 A1 | 2/2010 | Starr et al. |
| 2011/0122527 A1 | 5/2011 | Amir et al. |
| 2011/0213493 A1 | 9/2011 | Stutz |
| 2011/0292531 A1 | 12/2011 | Sato |
| 2012/0110257 A1 | 5/2012 | Enohara et al. |
| 2012/0148379 A1 | 6/2012 | Green et al. |
| 2012/0287532 A1 | 11/2012 | Acevedo et al. |
| 2013/0054006 A1 | 2/2013 | McClelland |
| 2013/0054007 A1 | 2/2013 | McClelland |
| 2013/0226333 A1 | 8/2013 | McClelland |
| 2013/0245813 A1 | 9/2013 | McClelland |
| 2014/0211602 A1 | 7/2014 | Hetzler et al. |
| 2014/0371902 A1 | 12/2014 | McClelland |

FOREIGN PATENT DOCUMENTS

| | | |
|---|---|---|
| JP | H0337686 U | 4/1991 |
| JP | H04302846 A | 10/1992 |
| JP | 0684251 A | 3/1994 |
| JP | 2002373464 A | 12/2002 |
| JP | 2004086251 A | 3/2004 |
| WO | 0041093 A2 | 7/2000 |

OTHER PUBLICATIONS

Non-Final Office Action from U.S. Appl. No. 14/476,618, dated Oct. 8, 2015.

Non-Final Office Action from U.S. Appl. No. 14/476,618, dated Mar. 25, 2015.

Non-Final Office Action from U.S. Appl. No. 13/754,714, dated Nov. 7, 2014.

Final Office Action from U.S. Appl. No. 13/754,714, dated Mar. 12, 2015.

Non-Final Office Action from U.S. Appl. No. 13/754,714, dated Mar. 23, 2015.

McClelland, G.M., U.S. Appl. No. 13/217,181, filed Aug. 24, 2011.

Non-Final Office Action from U.S. Appl. No. 13/217,181, dated Oct. 5, 2012.

Notice of Allowance from U.S. Appl. No. 13/217,181, dated Mar. 26, 2013.

McClelland, G.M., U.S. Appl. No. 13/558,232, filed Jul. 25, 2012.

Non-Final Office Action from U.S. Appl. No. 13/558,232, dated Oct. 3, 2012.

Notice of Allowance from U.S. Appl. No. 13/558,232, dated Apr. 8, 2013.

McClelland, G.M., U.S. Appl. No. 13/859,668, filed Apr. 9, 2013.

Non-Final Office Action from U.S. Appl. No. 13/859,668, dated Jun. 20, 2013.

Notice of Allowance from U.S. Appl. No. 13/859,668, dated Oct. 16, 2013.

McClelland, G.M., U.S. Appl. No. 13/888,287, filed May 6, 2013.

Non-Final Office Action from U.S. Appl. No. 13/888,287, dated Aug. 19, 2013.

Final Office Action from U.S. Appl. No. 13/888,287, dated Mar. 3, 2014.

Notice of Allowance from U.S. Appl. No. 13/888,287, dated Jun. 6, 2014.

McClelland, G.M., U.S. Appl. No. 14/476,618, filed Sep. 3, 2014.

Hetzler at al., U.S. Appl. No. 13/754,714, filed Jan. 30, 2013.

International Search Report and Written Opinion from PCT Application No. PCT/IB2014/058593, dated May 13, 2014.

Johnson, C., "IBM 3850—Mass storage system," AFIPS '75 Proceedings of the national computer conference and exposition, May 19-22, 1975, pp. 509-514.

Dean et al., "Multi-Arm Journaling," IBM TDB, Feb. 1, 1991, vol. 33, No. 9, pp. 107-111.

IBM "Systems: Introduction to the IBM 3850 Mass Storage System (MSS)," IBM, Third Edition, Jul. 1975, pp. 1-92.

Wikipedia "IBM 3850," Wikipedia—the free encyclopedia, retrieved Jan. 29, 2013, http://en.wikipedia.org/wikiIBM_3850.

Hanaoka et al., "Technologies for Realizing New Eternus LT270 High-End Tape Library System," Fujitsu Science Tech Journal, vol. 42, No. 1, Jan. 2006, pp. 24-31.

USPTO "Classification Definitions," Patents, Guidance, Tools, and Manuals, Classification, Robots, Section I—Class Definition, Dec. 2000, pp. 901-1-901-18.

Final Office Action from U.S. Appl. No. 13/754,714, dated Jul. 16, 2015.

Notice of Allowance from U.S. Appl. No. 14/476,618, dated May 6, 2016.

Office Action from German Patent Application No. 112014000347.6, dated May 18, 2017.

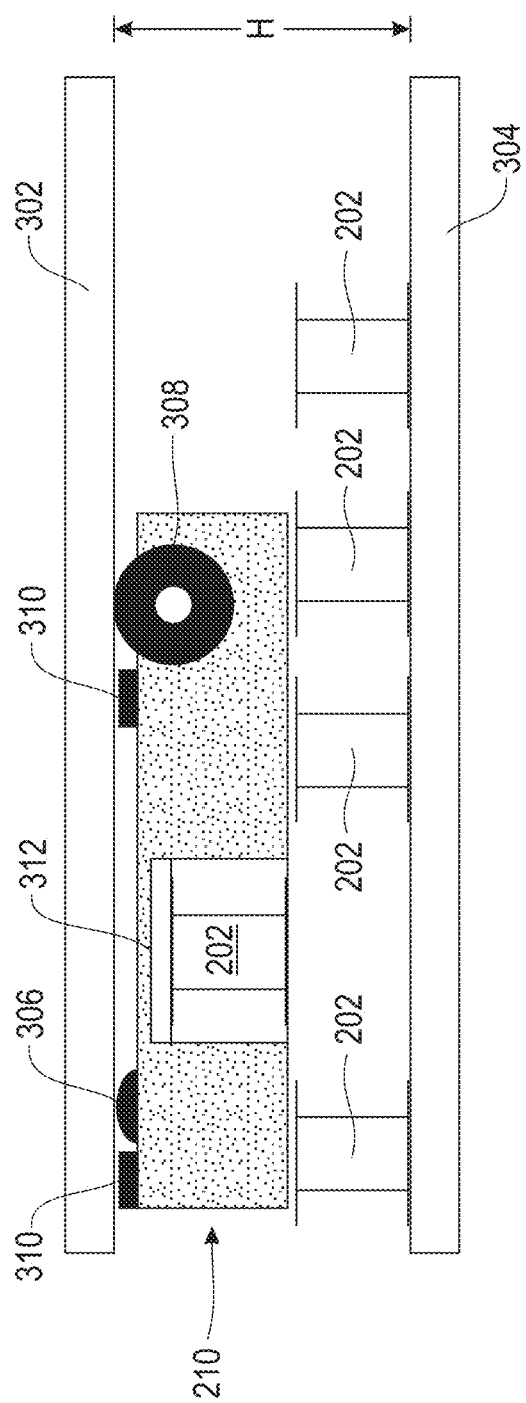

HIGH DENSITY HYBRID STORAGE SYSTEM

BACKGROUND

The present invention relates to data storage systems, and more particularly, to hybrid storage systems having tiers of data storage.

In magnetic storage systems, data are read from, and written onto, a magnetic recording medium utilizing magnetic transducers. Data are written on the magnetic recording medium by moving a magnetic recording transducer to a position over the medium where the data are to be stored. The magnetic recording transducer then generates a magnetic field, which encodes the data into the magnetic medium. Data are read from the medium by similarly positioning the magnetic read transducer and then sensing the magnetic field of the magnetic medium. Read and write operations may be independently synchronized with the movement of the medium to ensure that the data can be read from, and written to, the desired location on the medium.

In a tape drive system, magnetic tape is moved over the surface of the tape head at high speed. Usually the tape head is designed to minimize the spacing between the head and the tape. The spacing between the magnetic head and the magnetic tape is crucial so that the recording gaps of the transducers, which are the source of the magnetic recording flux, are in near contact with the tape to effect writing sharp transitions. Also when the read element is in near contact with the tape, effective coupling of the magnetic field from the tape to the read element is possible.

In the near future, with the adoption of improved media, the cost of storing information (on a per byte basis) on tape is expected to decline by a factor of five or more with respect to magnetic disk. Also, short-term and long-term reliability will continue to favor tape-based storage. Furthermore, as more mass storage is allocated to cloud networks, most storage will be in large libraries, rather than on individual drives, which is a consideration favoring tape-based storage. One historical disadvantage of tape-based storage with respect to disk-based storage was the relatively poor access time associated with tape-based storage, with the time required to bring the tape to the tape drive and then spool the tape to the file location typically averaging about 40 seconds.

BRIEF SUMMARY

A computer-implemented method according to one embodiment includes receiving a request for data; and determining whether the data is stored in a system comprising a linear storage media tier and/or in a second storage tier having higher performance than the linear storage media tier. The linear storage media tier includes: a plurality of reels having linear media thereon, a rest area for storing the reels when the reels are not in use, at least one linear media drive configured for reading and/or writing the linear media, and at least one mobile robot for transporting the linear storage media between the rest area and the at least one linear media drive, wherein the robot moves unconstrained along a first surface. The method also includes instructing the mobile robot to transport one of the reels having the data thereon to one of the linear media drives in the linear storage media tier when it is determined that the data is stored in the linear storage media tier; receiving the data from the one of the linear media drives; and sending the data.

A computer-implemented method according to another embodiment includes receiving a request to write data; determining whether to store the data in a linear storage media tier and/or in a second storage tier having higher performance than the linear storage media tier. The linear storage media tier includes: a plurality of reels having linear media thereon, a rest area for storing the reels when the reels are not in use, at least one linear media drive configured for reading and/or writing the linear media, and at least one mobile robot for transporting the linear storage media between the rest area and the at least one linear media drive, wherein the robot moves unconstrained along a first surface. The method also includes instructing the mobile robot to transport one of the reels to a selected linear media drive in the linear storage media tier when the determination is to store the data in the linear storage media tier; sending the data to the selected linear media drive for writing on the reel.

Other aspects and embodiments of the present invention will become apparent from the following detailed description, which, when taken in conjunction with the drawings, illustrate by way of example the principles of the invention.

BRIEF DESCRIPTION OF THE SEVERAL VIEWS OF THE DRAWINGS

FIG. 3 is a side view of a mobile robot, according to one embodiment.

DETAILED DESCRIPTION

Figure 1:
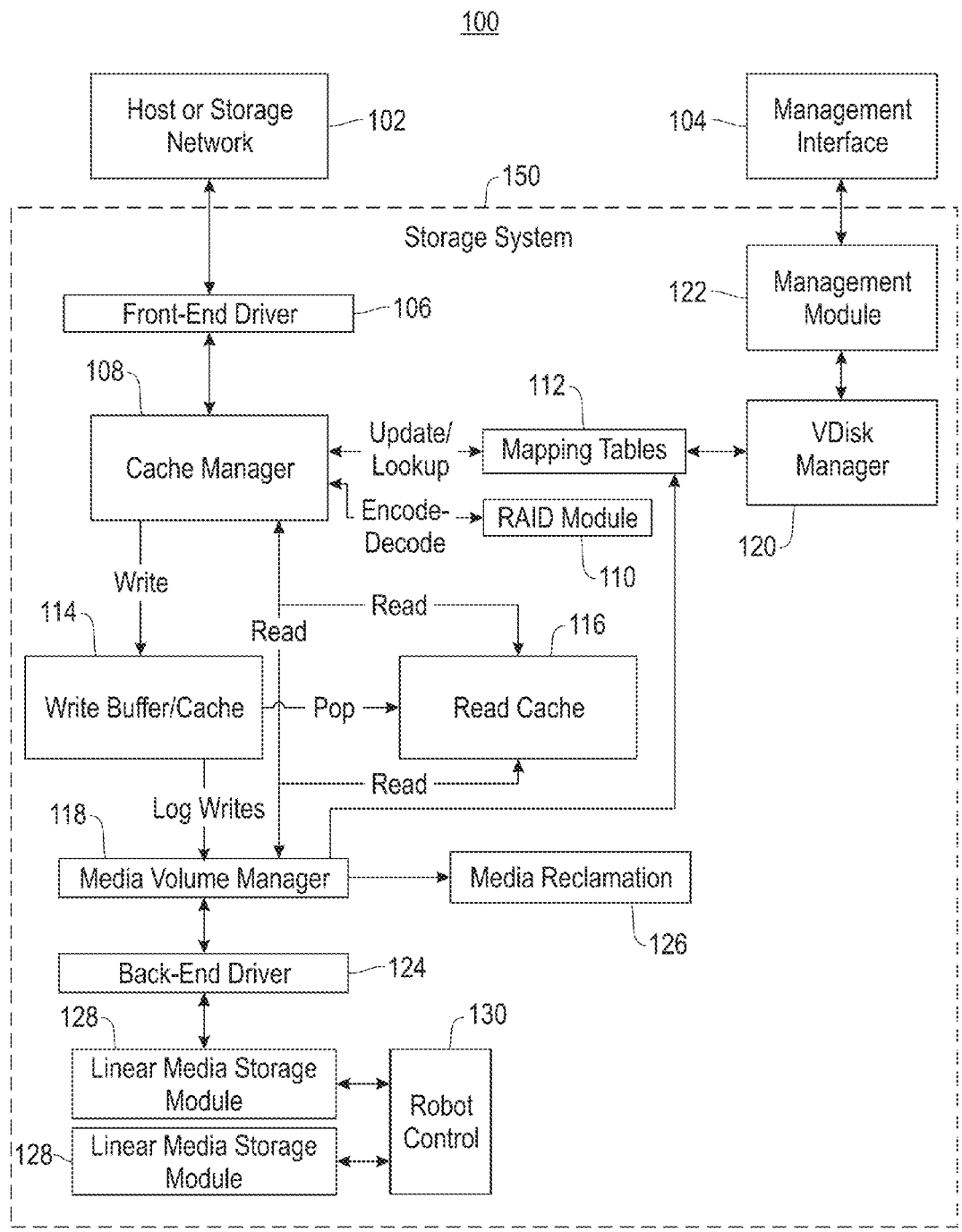
FIG. 1 is a functional block diagram according to an exemplary embodiment.

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an" and "the" include plural referents unless otherwise specified.

The following description discloses several preferred embodiments of data storage systems, as well as operation and/or component parts thereof.

In one general embodiment, a system includes a linear storage media tier; a second storage tier having higher performance than the linear storage media tier; a data controller for moving data between the tiers; and a host interface responsive to disk and/or network storage commands. The linear storage media tier includes: a plurality of reels having linear media thereon, a rest area for storing the reels when the reels are not in use, at least one linear media drive configured for reading and/or writing the linear media, and at least one robot for transporting the linear storage media between the rest area and the at least one linear media drive. The robot moves along a first surface via contact with the surface.

In another general embodiment, a system includes a linear storage media tier; and a host interface responsive to disk and/or network storage commands. The linear storage media tier includes: a plurality of reels having linear media thereon, a rest area for storing the reels when the reels are not in use, at least one linear media drive configured for reading and/or writing the linear media. A performance of the linear storage media tier is characterized by having a read access time to any block of data stored on any reel in the rest area in less than 10 seconds.

Conventional linear media (e.g., tape) systems are designed for sequential access performance and thus can have random read access times in excess of 1 minute which limits their usage, as disk access software stacks typically have a maximum access time limit of 20-30 seconds, after which it times out. Reducing the tape length can potentially achieve mean access times close to this limit, but leaves no room for unanticipated delays, makes it difficult to support a queue, and significantly increases costs.

A new system architecture for linear media storage that supports access times short enough to communicate through a disk access software stack without causing timeouts is desirable, and described herein. The embodiments and/or methods described and/or suggested herein preferably solve at least two problems associated with achieving liner media access times short enough for use with a disk software stack; random reads and random writes. According to one approach, random reads may be improved by designing a robot access mechanism and a linear tape storage and read/write system capable of retrieving a block of data from a random location in the system in a time substantially shorter than the disk stack timeout of the software in use therewith. One such robotic system is described in more detail below with reference to FIGS. 2A-9C. In brief, such a system uses a set of mobile robots to move linear media holders from a storage area to a read device such as a media drive. In some embodiments, a read device may include one or more winding stations, which pre-position the linear media near the desired target location prior to threading the media into the media drive. Such an arrangement allows for improved throughput by pipelining operations. Other approaches include high-speed pick-and-place robots.

The time to locate a data set on the linear media in various embodiments may be much faster than current systems. One aspect to achieving this is to be able to utilize the media in short lengths in combination with a fast locate mechanism. Media lengths in the tens of meters combined with locate speeds of 20 m/s or more can achieve locate speeds shorter than 1 second on average, once the medium is mounted to a media drive. Thus, the total time from receipt of a read request until the data is returned to the host may be designed to be significantly shorter than the disk stack timeout mentioned above. Such a fast access speed allows the system to support queuing; thus the performance can be scaled by adding additional read units, e.g., media drives. Some embodiments of such a system can achieve read access times of about 2 seconds or less, on average.

Moreover, though conventional linear media systems are not optimized for random write operations, various embodiments and/or methods described and/or suggested herein may accommodate random writes by converting them to a sequential write steam, such as by using log structure writes, but is not limited thereto. Such a system may preferably allow random writes to occur nearly at the speed of sequential writes. Thus, the random write speed can significantly exceed the random read speed. Moreover, a management layer may be used to process the writes and convert them to sequential format. This may reduce the cost of the system as fewer write drives are required to achieve a given level of random write performance. Alternatively, this may increase the read throughput of the system because more of the media drives may be allocated for reading operations that writing operations, e.g., where such drives are capable of both reading and writing.

To facilitate conversion of random writes to sequential writes, an embodiment may include a system having a write buffer/cache, preferably in addition to a read cache to improve the read performance of the system. Both of these caches may preferably utilize any media with higher random access performance than the linear media, such as one or more random access and/or direct access media which may include hard disks, solid state storage, dynamic random-access memory (DRAM), flash memory, nonvolatile memory (NVM), etc., and/or others noted herein and/or known in the art.

Thus, the linear media can be thought of as present in a linear storage media tier and the buffer/caches may be thought of as a second storage tier, having higher performance than the linear storage media tier. Referring to the present description, "performance" may preferably be in terms of delay from a data request, e.g., from a host or storage network, to the actual reading and/or writing of the data on the desired storage medium per such request. Without wishing to limit the invention in any way, in various approaches, a read and/or write request received by a storage system may initiate a process or operation in response to the request.

Moreover, the second storage tier may itself include a plurality of performance storage tiers, such as a combination of hard disk and/or solid state storage. Furthermore, the linear storage media tier may also include a plurality of performance storage tiers. Therefore, depending on the desired embodiment, different tasks for the second storage tier and/or the linear storage media tier may be performed in different performance storage tiers therein, having higher, lower, or the same performance as each other.

FIG. 1 depicts the functional block diagram 100 for a data storage system 150, in accordance with one embodiment. As an option, the present data storage system 150 may be implemented in conjunction with features from any other embodiment listed herein, such as those described with reference to the other FIGS. Of course, however, such data storage system 150 and others presented herein may be used in various applications and/or in permutations which may or may not be specifically described in the illustrative embodiments listed herein. Further, the data storage system 150 presented herein may be used in any desired environment.

Referring now to FIG. 1, the functional block diagram 100 includes a linear storage media tier, which includes the Linear Media Storage Modules 128, and a second storage tier, which includes the Write Buffer/Cache 114 and/or the Read Cache 116.

With continued reference to FIG. 1, a Host or Storage Network 102 and a Management Interface 104, both of which are connected to the storage system 150. The Host or Storage Network 102 may preferably control operations for the storage system 150 e.g., convey write requests, read requests, etc.; while the Management Interface 104 preferably controls logistical information of the storage system 150, including, but not limited to data ownership, data partitioning, data sensitivity, etc. Although not shown, the Host or Storage Network 102 and/or Management Interface 104 may also be connected or accessible to a host, a user, an administrator, computing device, etc. which may provide requests to be processed by the storage system 150.

According to various approaches, such requests may include write requests, read requests, etc., or any other request which would be apparent to one skilled in the art upon reading the present description. In a preferred approach, the system may include a host interface that is responsive to disk and/or network commands (explained in further detail below). In addition and/or alternatively, the host interface may be responsive to tape storage commands, e.g., from the Host or Storage Network 102. In an illustrative approach, the host interface may be responsive to disk and/or network storage commands from a disk and/or network storage interface, e.g., on a host, in a storage controller of a storage network, etc., in communication therewith. In one illustrative approach, communications between the Host or Storage Network 102 and the storage system 150 may be made via any known mechanism including fibre channel, bussing, a network such as a storage area network (SAN), Serial ATA (SATA), Serial Attached SCSI (SAS), Representational State Transfer (REST) systems, Network Attached Storage (NAS), object storage, etc. and combinations thereof.

Referring to the present description, the Host or Storage Network 102 and/or Management Interface 104 may be connected to the storage system 150 via a wire, cable, fibre, bus configuration, wirelessly, etc. depending on the desired embodiment. Moreover, any other connection with reference to the description of FIG. 1 may include a fibre, wire, cable, bus configuration, wirelessly, etc. depending on the desired embodiment.

Figure 11:
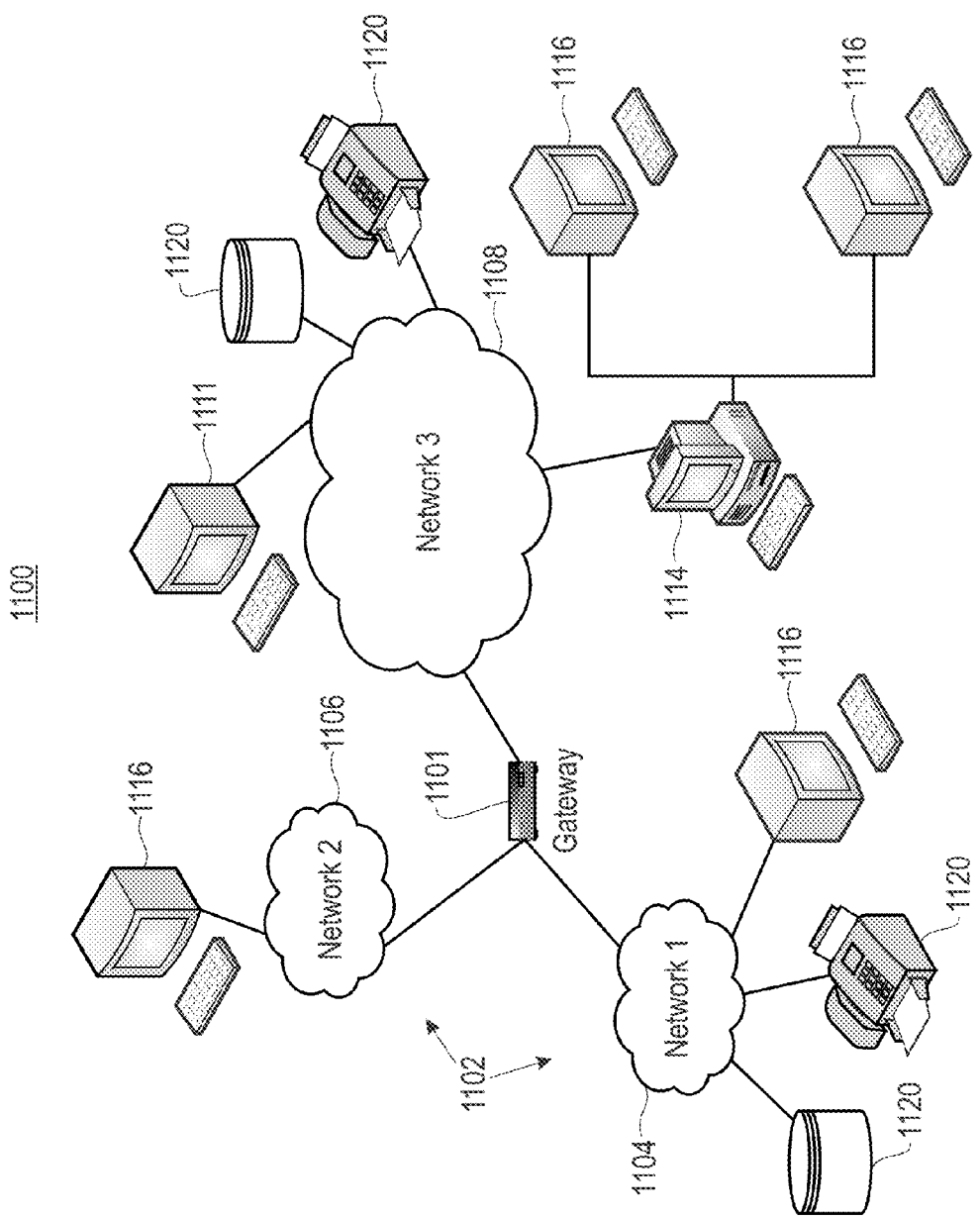
FIG. 11 is a depiction of a network architecture, in accordance with one embodiment.

According to an exemplary embodiment, the Host or Storage Network 102 of FIG. 1 may be represented by any of the networks 1104, 1106, 1108 of FIG. 11. Moreover, a host interface (not shown) and/or storage system 150 of FIG. 1 may be represented by the user devices 1116 and/or data server 1114 of FIG. 11 respectively. Thus, as illustrated in FIG. 11, the networks 1104, 1106, 1108 connecting user devices 1116 and data server 1114 may represent the Host or Storage Network 102 connection between the host interface (not shown) and storage system 150 of FIG. 1.

With continued reference to FIG. 1, the functional block diagram 100 further includes a Front-End Driver 106 which may be or be part of the host interface. Thus, the Front-End Driver 106 is connected to the Host or Storage Network 102, and preferably relays data and/or commands received from the Host or Storage Network 102 to a data controller, such as the Cache Manager 108. According to various approaches, the Front-End Driver 106 may include any driver which would be apparent to one skilled in the art upon reading the present description and/or that can be readily created by one skilled in the art upon reading the present description.

The Cache Manager 108 may process stored data and/or received data. The Cache Manager 108 and/or any other component of the storage system 150 may be implemented in hardware and/or software, and may make use of a processor (not shown) for executing commands of a type known in the art, such as a central processing unit (CPU), a field programmable gate array (FPGA), an application specific integrated circuit (ASIC), etc. Of course, any arrangement of a storage system may be used, as will be apparent to those of skill in the art upon reading the present description.

In different approaches, the Cache Manager 108 may process data stored in the Linear Media Storage Modules 128, the Redundant Array of Independent Disks (RAID) Module 110, the Mapping Tables 112, etc. In other approaches, the Cache Manager 108 may process data received from the Host or Storage Network 102, e.g., via a write request. Thus, depending on different process requests relayed from the Host or Storage Network 102, the Cache Manager 108 may perform different operations. For example, a write request may initiate a write process, as will soon become apparent; where a read request may initiate a read process which will be explained in further detail below. According to other approaches, requests received by the Cache Manager 108 may also include written data, write mapping, erase requests, status requests, etc., or combinations thereof.

With continued reference to FIG. 1, a write request may be received by the Cache Manager 108, preferably regarding data to be stored within the storage system 150. According to an example, which is in no way intended to limit the invention, a write request received by the Cache Manager 108 may include random access input write data. In other approaches, a write request may include linear data, sequential data, random data, etc., or any other form of data which would be apparent to one skilled in the art upon reading the present description.

The Cache Manager 108 may determine whether a RAID function and/or other reconstruction operations should be applied to the write request data, e.g. by using the RAID Module 110, preferably before the data is written. As illustrated in FIG. 1, the Cache Manager 108 is connected to the RAID Module 110, whereby data may be encoded and/or decoded therebetween e.g., by applying the RAID function. The RAID function may preferably be applied to received write data, as reliability of the overall system may be enhanced by the inclusion of the RAID function. Moreover, the RAID function may be used to protect data regardless of its desired storage location. In another approach, the RAID function may be applied to data stored within the storage system 150 before being returned e.g., in response to a read request. According to one approach, the RAID function may change data from random data to sequential data, but may incorporate any other combination of data forms listed herein.

The Cache Manager preferably presents itself to attached hosts as a disk storage controller. The Cache Manager can expose the storage space as "virtual disks" (VDISK), which allows the thin-provisioning and extensibility of storage.

According to another approach, although the data and/or meta-data may be RAID protected on the second storage tier, it may also be desirable to have the data written to linear media to be self-describing. By "self-describing", what is meant is that it is possible to recover all the state information required to properly identify a data block by reading information from the linear media tier. In one illustrative embodiment, the system will conform a self-describing index of the data contained within the linear storage tier which can be used to efficiently recover mapping information describing the set of extents written to that tier and unambiguously identify them as belonging to a particular virtual disk, as well as to identify the logical block address (LBA), or equivalently the logical extent number within the VDISK. In a further approach, the VDISK may be managed and/or updated by the VDISK Manager 120.

In a preferred approach, data pertaining to a write request may be stored in the linear storage media tier, e.g., written to linear tape in the Linear Media Storage Modules 128. However, according to different approaches, data pertaining to a write request may be stored in the Write Buffer/Cache 114, the Read Cache 116, etc., or any combination thereof e.g., in part, a majority, etc., depending on the desired embodiment. In one approach, data may be stored in a given media within the storage system 150 depending on the data's importance, size, request frequency, etc. According to an example, which is in no way intended to limit the invention, the storage system 150 may receive random access input write data for a write request, e.g., from a host, and convert the random access input write data to sequential data as described above. Moreover, the sequential data may then be stored on the linear media in the Linear Media Storage Modules 128. If the data is expected to be read out soon and/or frequently, the write data may also and/or alternatively be stored in the read cache 116 for faster access.

With continued reference to FIG. 1, the Cache Manager 108 may also control movement of data between the second storage tier, e.g., the Write Buffer/Cache 114, and the linear storage media tier, e.g., the Linear Media Storage Modules 128. In one approach, the Cache Manager 108 may select data from separate write requests to be combined together for a common write operation. Thus the Cache Manager 108 may preferably allow for the write data associated with several random access write requests to be accumulated in the second tier prior to being moved (e.g., written) to the linear storage media tier. In one approach, the write data accumulated in the Write Buffer/Cache 114 may be accumulated in the second storage tier such that at least an integer number of full wraps of tape on a tape reel are written to the linear media in a single pass, regardless of the tape reel dimensions. Thus, if the write data accumulated in the second tier does not equate to at least an integer number of full wraps of tape on the tape reel, the write data may preferably be held in the second tier until the write data accumulated therein does equate to at least an integer number of full wraps of tape on the tape reel. This may reduce the overall write time and increase the system's write efficiency by combining and thereby minimizing tape reel retrievals (explained in further detail below). Perhaps more importantly, this helps increase the areal density of the tape, corresponding to an increase in capacity. However, in other approaches, which are in no way intended to limit the invention, the write data accumulated in the second tier may be held there until a different benchmark is met, including but not limited to a time limit, an urgency level, user override, a request, etc.

In a further embodiment, the write data is streamed directly to the linear storage media tier, rather than being accumulated in the second tier prior to being moved to the linear storage media tier. In such approach, a second tier may or may not be present in the system.

Therefore, incorporating a data controller e.g., the Cache Manager 108 may allow the media block size to be larger than conventional request block sizes. This creates a more efficient linear media write process because a larger write request, which may incorporate multiple smaller write requests, is more efficient than performing each of the multiple smaller write requests individually within the Linear Media Storage Modules 128, as will soon become apparent.

The Linear Media Storage Modules 128 may include any configuration described and/or suggested herein, particularly in view of the description of FIGS. 2A-3 below. Thus, referring to FIGS. 2A-3, linear media (i.e., tape) may preferably be wound on tape reels 202, also referred to herein as spools. The tape reels 202 may lie on a lower surface 304, such as a "floor," of a rest area for storing the reels when the reels are not in use. According to different approaches, the rest area may have one level, more than one level, etc., as explained below, and may further include, but is not limited to ramps to preferably provide for the movement of linear media between the levels. The rest area is preferably a horizontal surface on which the tape reels rest; however in other approaches, the rest area may incorporate a vertical, angled, terraced, stacked, etc. surface, or combinations thereof. In such alternate approaches, the tape reels may be attached to and/or supported by the rest area by using hooks, lips, magnets, shelves, sleeves, posts, etc. or some other design to counteract the force of gravity on the tape reels if desired.

With reference to FIG. 3, the mobile robots 210 may maneuver on an upper surface 302 via contact with that surface such as having drive wheels and magnetic attraction between the mobile robot 210 and the upper surface 302 or portions of the upper surface (see FIG. 3). Therefore, a library of tape reels may lie on a lower surface, such as a "floor," while a mobile robot maneuvers on the upper surface. The robots can pick up tape reels and move them to other locations, such as from the rest area to a winding station or a media drive, depending on the desired embodiment.

Referring again to the Linear Media Storage Modules 128 of FIG. 1, they may also have a mechanism for selectively moving the reels from the rest area for engagement with at least one robot. According to various approaches, the mechanism may include a retractable arm, a magnet, a suction device, etc. As illustrated in FIG. 3, the mechanism may include, but is not limited to a reel gripper 312 which may move the reels 202 vertically from a horizontal rest area 304, for engagement with the at least one mobile robot 210 thereabove.

With continued reference to FIG. 1, the data storage system 150 may include a Robot Control 130. As illustrated in FIG. 1, the Robot Control 130 is preferably in communication with the Linear Media Storage Modules 128 and may control and/or manage the mobile robots therein. In various approaches, the Robot Control 130 may control and/or manage normal operating conditions, high traffic conditions, damage situations, overflow, high priority requests, etc. or any other situation which would be apparent to one skilled in the art upon reading the present description. The Robot Control 130 may additionally be connected to any other portions of the Storage System 150 e.g., to receive commands, updates, information, etc. therefrom. Additionally, the Robot Control 130 may be connected to a host, a user, an administrator, computing device, etc. which may provide requests to be processed by the Robot Control 130. Moreover, the linear storage media tier may have a control unit (not shown) which may implement host communication, data management, control functions, etc.

Furthermore, as referred to above, the Cache Manager 108 may allow for a more efficient linear media write process due to the fact that a large write request includes multiple smaller write requests in some embodiments. For example, which is in no way intended to limit the invention, a larger write request out to the linear storage media tier incorporating multiple smaller write requests from a host includes aggregating the smaller write requests into the larger write request; and finding, loading, writing and replacing a tape reel only once; whereas if each of the multiple smaller write requests were performed individually, multiple tape reels would be found, loaded, written to and replaced for each of the multiple smaller write requests. Therefore, including such functionality in the data controller (e.g., Cache Manager 108) reduces the write time, power consumption, wear, etc., thereby improving system performance, and allowing for separate optimization of performance and capacity.

To further increase a storage system's performance, additional drives may be included in any tier of the system.

In one illustrative embodiment, access performance of the linear storage media tier is characterized by allowing data to be retrieved from anywhere in the system within an access time limit of the disk and/or network storage interface.

In another illustrative embodiment, a performance of the linear storage media tier of a memory storage system may be characterized by having a read access time to a block of data stored on a given reel in the rest area in less than 10 seconds. More preferably, the performance of the linear storage media tier may be characterized by having a read access time to any block of data stored on any reel in the rest area in less than 30 seconds, preferably less than 20 seconds, and ideally less than 10 seconds. The fast read access times and write times for the linear storage media tier may allow it to function in combination with a higher performance tier, e.g., the second tier. Thus, one or more of the Linear Media Storage Modules 128 may include at least two drives, e.g., linear media drives. According to one approach, at least one of the linear media drives may be configured for both reading and writing the linear media. Thus, a read and/or write request may not be limited based on which drives are being used at a given time and multiple operations may be processed at the same time, regardless of whether they are read or write operations. In one illustrative example, read operations may be directed to drives not already performing operations. This allows for reading and writing to occur simultaneously, thereby avoiding an interruption to the write process while also preventing the reading process from being delayed until the writing has been completed, or vice-versa. For example if a drive is used for a write or read operation request, it may subsequently be used for a write or read operation request if desired.

Although physical drives may be capable of both reading and writing linear media, it may be preferable for a given drive or drives to perform only one of these operations (i.e., reading or writing) for an extended period of time. Additionally, there may be a cost advantage in having separate linear media drives due to the reduced amount of electronics, heads, etc. Moreover, since the sequential write method provides higher effective random write performance, system cost may be reduced by combining a number of write drives with a larger number of read-only drives. Thus, it may be preferable for at least a subset, a majority, all, etc. of the drives in a linear storage media tier to be optimized for writing or reading exclusively.

As explained herein, achieving access times less than about 10 seconds, and preferably near about 1 second, allows for the use of queuing. The response time for a queued IO can also be improved by overlapping operations thereby further improving performance by increasing throughput. Thus, a plurality of mobile robots may be used in a system, e.g., the linear storage media tier, which may utilize the plurality of robots in overlapping operations to increase a data throughput of the system.

With continued reference to FIG. 1, write data corresponding to write requests may be accumulated in the Write Buffer/Cache 114 of the second tier, prior to being moved (e.g., written) to the linear storage media tier; thus the Write Buffer/Cache 114 may serve as a queue. In a preferred approach, the Write Buffer/Cache 114 may format the write data as log writes before sending the write data to the Media Volume Manager 118 connected thereto as shown in FIG. 1. Log writes preferably allow for data to be sequentially written to the linear media, regardless of the data's form received by the write request. Thus, data pertaining to multiple write requests accumulated in the second tier may implement a log format and be written sequentially.

According to an illustrative example, which is in no way intended to limit the invention, write requests $A_2$, $D_2$ and $F_2$ may be received and grouped by the Cache Manager 108 in the Write Buffer/Cache 114 before being written to the linear storage media tier. The data pertaining to write requests $A_2$, $D_2$ and $F_2$ may be continuations of the data from previously executed write requests $A_1$, $D_1$ and $F_1$ respectfully, which may already be written to separate locations within the linear storage media tier, e.g., on different portions of different tape reels. Rather than performing write requests $A_2$, $D_2$ and $F_2$ only after retrieving the data from each write request $A_1$, $D_1$ and $F_1$ individually, log writes allow for the data pertaining to write requests $A_2$, $D_2$ and $F_2$ to be written sequentially on the most efficiently accessible portion of linear media within the linear storage media tier, or any other desired location within the linear storage media tier. The locations of the data pertaining to write requests $A_2$, $D_2$ and $F_2$ on the linear storage media may be stored in the mapping tables 112.

Figure 2A:
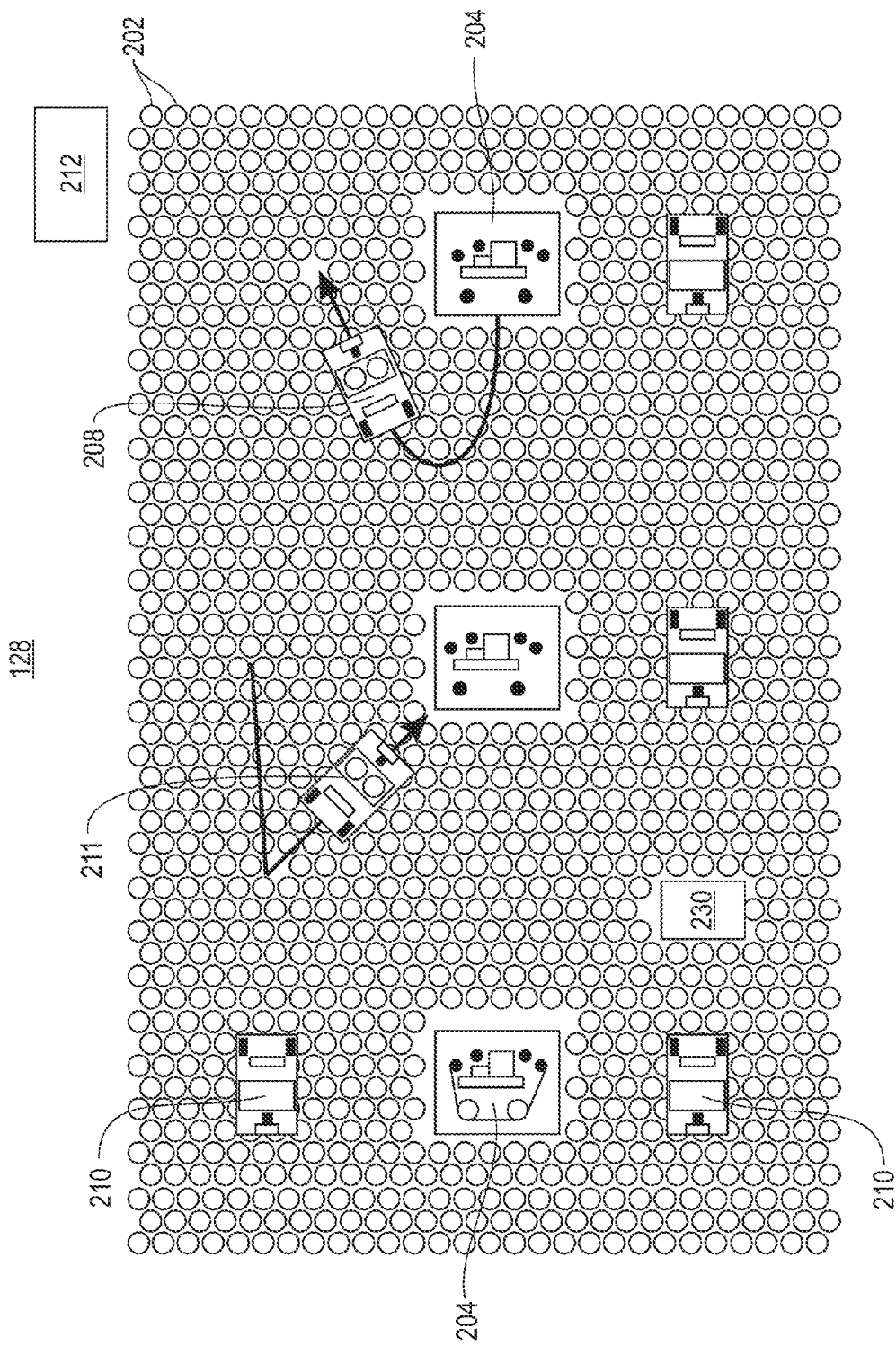
FIG. 2A is a top down view of a system using mobile robots for faster access to tape, according to one embodiment.

In a system utilizing mobile robots to pick and place the linear media as illustrated in FIG. 2A, having more than one robot service a drive in overlapping operations can improve the read throughput. This is possible because a first robot can be returning a first tape from the drive to the rest location, while a second robot is delivering a second tape from its rest location to the drive. Therefore, as described above in reference to FIGS. 2A-3, a system may include at least one, at least two, multiple, etc. mobile robots for transporting the linear storage media between the rest area and the at least one linear media drive. The mobile robots may preferably transport the linear storage media by retrieving at least one tape reel and moving it to a desired location e.g., a winding station, a drive, the rest area, etc. According to various approaches, the mobile robots may include, but are not limited to, any mobile robot described and/or suggested herein, depending on the desired embodiment.

Other operations may be overlapped as well. For example, referring back to FIG. 2A, at least one winding station 230 may be included for performing coarse locate operations on the tape reels 202 prior to the reels being mounted to the tape drive 204 for read and/or write operations, and subsequent rewind operations. In a preferred approach, coarse locate operations may include locating particular portions of the tape stored on a given tape reel in a minimized time. Moreover, the coarse locate operations may be conducted while other reels are being read and/or written to, thereby overlapping operations. For example, which is in no way intended to limit the invention, a tape reel may have a particular data set written thereon up to a certain location between ends of the tape medium at a certain wrap. To prepare the tape reel for writing thereon, the coarse locate operation may quickly wind the tape until reaching a position believed to be slightly before the end of the written data. If the winding station has a head, the winding station may then proceed in a slower fashion until the end of the written data is located. If the winding station does not have a head, the media drive that subsequently receives the tape reel can quickly find the end of data on the tape because of the pre-positioning. Thus, the coarse locate operation may locate the end of written data faster than is possible using the drives directly, without passing the end of the written data, thereby preventing unnecessary time delay in locating the end of the written data.

In another example, which is in no way intended to limit the invention, coarse locate operations may be used to reduce the total time from receipt of a read request until the data is returned to the host from a tape reel. The coarse locate operations may utilize the mapped location of data written to the reels which may be stored in a map of a mapping module. This may preferably reduce the read access time to a block of data stored on a given reel (explained in further detail below). Thus, coarse locate operations of the at least one winding station may overlap locating operations with reading and robot motion, which may result in a further increase to the utilization of the system.

To keep track of where data is stored, particularly in relation to corresponding data, some sort of mapping scheme is desirable. Such a mapping scheme may preferably be capable of identifying the physical location of the current version of each logical block, of which the information is also referred to herein as meta-data.

With continued reference to FIG. 1, Mapping Tables 112 are also included in the storage system 150. The Mapping Tables 112 keep track of where the data and/or meta-data is stored in the storage system 150, preferably such that any data may be located and accessed after it is written. In one approach, this allows for the storage system 150 to keep track of each of the possibly multiple locations that a particular data set is stored in the Linear Media Storage Modules 128. Thus, the Mapping Tables 112 may preferably be accessed and/or updated with each write and/or read request. However, the Mapping Tables 112 may be accessed and/or updated after each write request has been completed, before each read request is processed, at timed intervals, upon request (e.g. from a user), etc. depending on the desired embodiment.

A mapping module may be included to maintain a map, e.g., a mapping table, database, etc., preferably in the second tier, of data on the linear media. The Mapping Tables 112 are preferably stored or cached in the second storage tier which has higher (e.g. faster) performance than the linear media storage tier. It may be advantageous to keep a copy of the data and/or meta-data in the second storage tier such that IO operations may be completed without the need for reading meta-data from the slower linear media. Thus, the location of an item of data can be determined without the need to access the slower liner media storage tier, thereby increasing processing speed, data locating speed, data lookup speed, etc. However, according to other embodiments, mapping tables may be stored in the linear media, a third storage tier having any level of performance, on both the second storage tier and the linear storage media tier, across the second storage tier and the linear storage media tier, etc.

In further embodiments, the storage system 150 may include any number of data storage tiers, and may include the same or different storage memory media within each storage tier. For example, each data storage tier may include the same type of storage memory media, such as HDDs, SSDs, sequential access media (tape in tape drives, optical disk in optical disk drives, etc.), direct access media (CD-ROM, DVD-ROM, etc.), or any combination of media storage types. In one such approach, a second storage tier may include a majority of SSD storage media for storing data in a higher performing storage environment, and remaining storage tiers, including linear storage media tiers and/or any additional storage tiers may include any combination of SSDs, HDDs, tape drives, etc., for storing data in a lower performing storage environment. Therefore, more frequently accessed data, data having a higher priority, data needing to be accessed more quickly, etc., may be stored to the second storage tier, while data not having one or more of these attributes may be stored in any of the additional storage tiers, including a linear storage media tier. Of course, one of skill in the art, upon reading the present descriptions, may devise many other combinations of storage media types to implement into different storage schemes, according to the embodiments presented herein.

As a further aid to disaster recovery, it may be advantageous to checkpoint the mapping information of the Mapping Tables 112 to the linear media or some other storage as well. According to different approaches, the mapping information may be stored in the Mapping Tables 112, a virtual disk manager, a memory module, a media volume manager, etc. A virtual disk (VDISK) manager 120 may allow the system to present a logical view of the system as a plurality of virtual disks, or VDISKS, which also facilitate the enablement of thin provisioning (see 120 of FIG. 1).

According to different approaches, the Mapping Tables 112 may include lookup tables such as block mapping tables, charts, scatterplots, probability functions, etc., or any other storage method and/or system which would be apparent to one skilled in the art upon reading the present description. In an illustrative approach, the Cache Manager 108 may manage the information regarding the location where the data is actually stored within the Linear Media Storage Modules 128.

In one approach, written data may be stored in a unique location within the storage system 150, e.g., a unique location within the Linear Media Storage Modules 128. Thus the Mapping Tables 112 may be used to keep track of the physical location of the data when the data is stored in a unique location. Moreover, the Mapping Tables 112 may also be able to keep track of data when it is stored in multiple locations and/or partitioned into multiple segments.

In a preferred approach, portions of the data may be stored in more than one location within the storage system 150, more preferably in more than one location within the Linear Media Storage Modules 128. Therefore, if a portion of the data stored within the Linear Media Storage Modules 128 is damaged, lost, stolen, corrupted, etc., that data portion may be recovered via error correction data from the other data portions stored in the other locations within the Linear Media Storage Modules 128. Moreover, data may be stored as segments, each of which may be stored in different location within the Linear Media Storage Modules 128. In a preferred approach, a write request for the Linear Media Storage Modules 128 may be split into multiple smaller segments, each representing a small portion of the data which makes up the write request. According to various approaches, a segment may include data which represents an entire write request, the majority of a write request, half a write request, a fraction of a write request, etc. Furthermore, each of the multiple smaller segments may be stored in different locations within the Linear Media Storage Modules 128. Therefore, if some of the data stored within the Linear Media Storage Modules 128 pertaining to a write request is damaged, lost, stolen, corrupted, etc., the remainder of the smaller data segments may be retrieved from their respective locations within the Linear Media Storage Modules 128.

According to an exemplary embodiment, which is in no way intended to limit the invention, if an entire tape reel within the Linear Media Storage Modules 128 is damaged such that the data thereon is unreadable, the lost data may be accessed from its other locations if redundantly stored, and/or recreated from its other segments within the Linear Media Storage Modules 128. According to another approach, data may be stored in multiple locations and/or partitioned into multiple segments within the storage system 150, preferably within the Linear Media Storage Modules 128, depending on the desired embodiment.

With continued reference to FIG. 1, the Mapping Tables 112 are connected to the VDISK Manager 120. VDISKs may help in the partitioning of the data stored in the storage system 150 by using thin provisioning, or any other approach which would be apparent to one skilled in the art upon reading the present description. Moreover, as shown in FIG. 1, the VDISK Manager 120 is connected to the Management Module 122 and the Management Interface 104. Therefore, the VDISK Manager 120 may receive and process requests from the Management Module 122 and/or the Management Interface 104, and may contribute towards the management of the write data.

Referring back to the Write Buffer/Cache 114 of FIG. 1, the write data (e.g. log writes) may be sent to the Media Volume Manager 118 connected thereto as shown in FIG. 1. The Media Volume Manager 118 may be used to allocate linear media volumes and for transferring data to and from the linear media. To do so, the Media Volume Manager 118 may preferably communicate with the Back-End Driver 124 and Media Reclamation 126. The Media Reclamation 126 preferably manages which portions of the linear media within the Linear Media Storage Modules 128 are empty, have data written thereto, are eligible for data stored thereon to be deleted, etc. Thus, the Media Reclamation 126 may inform the Media Volume Manager 118 which portions of the linear media within the Linear Media Storage Modules 128 may be successfully written to without affecting the data to be retained in the Linear Media Storage Modules 128. According to one approach, media reclamation may be called by the Media Volume Manager 118 to make a tape reel partially, completely, etc. empty and/or available for overwrite. This may be accomplished by enabling writing over the data on the tape, replacing the tape on a spool with a new blank tape, replacing the tape and reel with a new reel with new tape, etc.

Moreover, the Back-End Driver 124 may enable communication between the Media Volume Manager 118 and the Linear Media Storage Modules 128 for management and/or control of the linear media of the Linear Media Storage Modules 128. Thus, the Back-End Driver 124 may preferably assist in writing data to the linear media of the Linear Media Storage Modules 128 as described above.

The Mapping Tables 112, VDISK Manager 120, Media Volume Manager 118, Media Reclamation 126 and/or the Back-End Driver 124, or any other items within the storage system 150 may also be used when accessing written data to satisfy a read request. As mentioned above, a request received from a host, a user, an administrator, computing device, etc., may be a read request. In one example, a read request may prompt the retrieval of written data, stored within the storage system 150.

According to various approaches, the written data may include data stored in the storage system 150 according to any approach listed herein with regard to write requests and/or write data. Thus, in a preferred approach, data pertaining to a write request may be stored in the linear storage media tier, e.g., written to linear tape in the Linear Media Storage Modules 128. However, according to different approaches, data pertaining to a write request may be stored in the Write Buffer/Cache 114, the Read Cache 116, etc., or any combination thereof e.g., in part, a majority, etc., depending on the desired embodiment.

The Cache Manager 108 may process a read request, received from the Host or Storage Network 102. According to an example, which is in no way intended to limit the invention, a read request received by the Cache Manager 108 may pertain to a read request to randomly written data.

The read request may preferably initiate a read process as described above and illustrated in the functional block diagram 100. With continued reference to FIG. 1, after the Cache Manager 108 receives a read request, the Mapping Tables 112 may be accessed to look up the location of the written data pertaining to the read request. According to different approaches, the Mapping Tables 112 may incorporate any approach described and/or suggested herein, and may preferably provide the Cache Manager 108 with the location of the written data pertaining to the read request, within the storage system 150. Moreover, the VDISK Manager 120 may additionally or alternatively provide the Cache Manager 108 with information regarding the location of the written data.

The Cache Manager 108 preferably also communicates with the Read Cache 116 and the Media Volume Manager 118. In one approach, the Cache Manager 108 may determine data to be combined together for common read requests, thereby acting like a queue. Thus the Cache Manager 108 may preferably allow for the read data associated with several read requests to be accumulated in the second tier, e.g., the Read Cache 116, prior to accessing the linear storage media tier. As explained above, this may decrease lookup time, increase performance of the system, etc., which is desirable. However, read requests may be performed individually e.g., due to a given read request having a large read request size, a high priority, a user override, etc. According to another illustrative approach, the Read Cache 116 and/or Cache Manager 108 may process read requests individually if no other read requests are received within a certain time limit, thereby minimizing losses.

Depending on the situation, the Media Volume Manager 118 may receive a read request from the Read Cache 116, or the Cache Manager 108 directly. After receiving a read request, the Media Volume Manager 118 preferably communicates with the Back-End Driver 124 regarding the written data location within the Linear Media Storage Modules 128. The Back-End Driver 124 preferably facilitates location and retrieval of the requested data within the Linear Media Storage Modules 128 pertaining to the received one or more read requests. After being located and returned to the Back-End Driver 124 and Media Volume Manager 118, the data may be sent to the Cache Manager 108.

Upon receiving the written data, the Cache Manager 108 may have the data encoded and/or decoded preferably using the RAID function described above, before being output e.g., to the Host or Storage Network. In various approaches, the data may be output in any form listed herein including, but not limited to sequential data, random data, etc. Moreover, the data may be output without being encoded and/or decoded in part or in full.

Throughout the read and or write process, the Mapping Tables, VDISKs, Management Module, Read Cache, Media Reclamation, etc. may be updated e.g., for future requests.

Moreover, it may be useful for the Linear Media Storage Modules 128 to have a fixed set of media, without provisions for direct user replacement. Thus, the system may have a finite set of media and/or drives. The system may thus ensure that all the media in the system was written by drives in the system. This will enable the system to store calibration or other characterization data for each tape and each drive, which can help increase the areal density and allow the drive to more quickly acquire proper tracking and channel initialization. Further, it can remove the need for generational compatibility with media and heads, which is beneficial for areal density. New media and drives could still be introduced into the system, such as during maintenance. However, these are rare events, thus the characterization can be performed as needed. Such a system can dispense with the generation compatibility common to tape systems, which tends to limit the achievable areal density.

FIG. 2A depicts a detailed view of the Linear Media Storage Module 128 in accordance with one embodiment. As an option, the present Linear Media Storage Module 128 may be implemented in conjunction with features from any other embodiment listed herein, such as those described with reference to the other FIGS. Of course, however, such Linear Media Storage Module 128 and others presented herein may be used in various applications and/or in permutations which may or may not be specifically described in the illustrative embodiments listed herein. Moreover, the Linear Media Storage Module 128 presented herein may be used in any desired environment. Further still, the Linear Media Storage Module 128 is in no way limited to that which is illustrated in FIG. 2A and may include any parts and/or orientation of parts which would be desirable depending on various embodiments.

As shown by the partial top down view of FIG. 2A and the partial side view of FIG. 3, a Linear Media Storage Module 128, such as a tape library may include one or more mobile robots 210 for transporting at least one tape reel 202, which may or may not be part of a tape cartridge, to and from tape drives 204 for reading data from the tape.

Figure 2B:
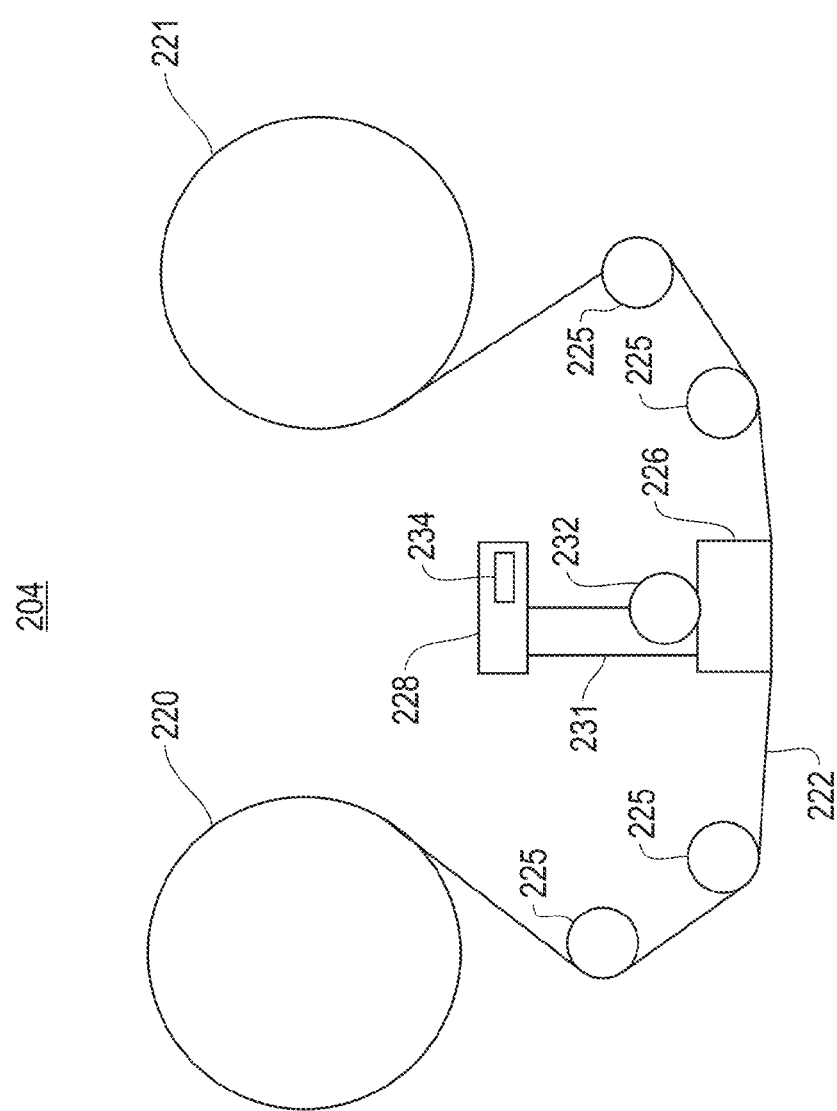
FIG. 2B is a schematic diagram of a simplified tape drive system according to one embodiment.

FIG. 2B illustrates a simplified view of the tape drive 204 of a tape-based data storage system, which may be employed in the context of the present invention. While one specific implementation of a tape drive is shown in FIG. 2B, it should be noted that the embodiments described herein may be implemented in the context of a variety of tape drive systems.

As shown, a tape supply reel 220 and a take-up reel 221 are provided to support a tape 222. One or more of the reels may form part of a removable cartridge and are not necessarily part of the tape drive 204. The tape drive, such as that illustrated in FIG. 2B, may further include drive motor(s) to drive the tape supply reel 220 and the take-up reel 221 to move the tape 222 over a tape head 226 of any type. Such head may include an array of readers, writers, or both.

Guides 225 guide the tape 222 across the tape head 226. Such tape head 226 is in turn coupled to a controller assembly 228 via a cable 231. The controller 228 typically controls head functions such as servo following, writing, reading, etc. The controller may operate under logic known in the art, as well as any logic disclosed herein. The cable 231 may include read/write circuits to transmit data to the head 226 to be recorded on the tape 222 and to receive data read by the head 226 from the tape 222. An actuator 232 controls the position of the head 226 relative to the tape 222.

An interface 234 may also be provided for communication between the tape drive and a host (integral or external) to send and receive the data and for controlling the operation of the tape drive and communicating the status of the tape drive to the host, all as will be understood by those of skill in the art.

The tape on the selected tape reel or pair of tape reels may be accessed by the mobile robots 210, which may be miniature remote-controlled vehicles that move via contact with a surface (such as an upper surface 302, used interchangeably with the term "ceiling," as shown in FIG. 3). Thus, the tape reels may lie on a lower surface, such as a "floor," while a mobile robot maneuvers on the upper surface via contact with the surface, such as by utilizing drive wheels and magnetic attraction between the robot and the upper surface or portions of the upper surface (see FIG. 3). In one approach, the tape library may comprise more than one level. On each level, tape reels may be arranged on a lower surface (used interchangeably with the term "floor") in a dense pattern. This arrangement is shown in partial top down view of FIG. 2A, according to one embodiment.

A contiguous tape may be stored on a single reel, and may include a pin or other end piece that enables threading of the tape in the tape drive. In other approaches, the tape may be coupled to a pair of reels, e.g., in a tape cartridge.

According to one embodiment, magnetic tape may be included in miniature tape reels 202 which have only a fraction of the tape length of a standard tape cartridge, thereby decreasing seek time. Such shorter length may be, e.g., less than about ⅕th the tape length of a standard Linear Tape Open (LTO) tape cartridge, less than about ¹/₂₅$^{th}$ the tape length of a standard tape cartridge, less than about ¹/₅₀th the tape length of a standard tape cartridge, etc. In some approaches, a length of tape on the plurality of tape reels 202 may be less than about 50 meters for each tape reel 202, and may be preferably less than about 25 meters, more preferably 20 meters or less, etc.

The seek time of tape-based systems using such tape reels may also or alternatively be decreased by increasing the locate speed, e.g., to about 20 meters per second (m/s) or faster. "Locate time" refers to the time required for the tape to wind to the beginning of a data set (or file) after the tape is loaded in the tape drive. If the tape length is reduced to about 20 m or less and the locate speed is about 20 m/s, the average locate time is (20 m/20 m/s)/2=0.5 s. In addition to decreasing the seek time in the drive, the system seek time may be reduced by structuring the tape library to achieve a mean load time of about 0.5 s. "Load time" refers to the time between the first time when a request reaches the tape library and a second time when the relevant tape reel(s) are loaded in the tape drive.

According to one embodiment, the tape system is configured such that the average seek time is less than about 2 seconds, preferably about 1 second or less. The seek time is the delay between a first time when a request to access data is received by the tape library, and a second time when the tape library begins to provide the data to the requester.

With continued reference to FIG. 2A, the tape reels 202 may be closely packed, for example in a hexagonal array, ordered array, circular arrangement, etc., to maximize the number of tape reels that may be stored in a limited amount of space.

According to one embodiment, a diameter of each of the plurality of tape reels 202 may be less than about 100 mm, such as less than about 50 mm, less than about 40 mm, less than about 30 mm.

In some approaches, a single tape drive 204 is available for reading and/or writing tape on the tape reels 202. Depending on the frequency with which files are read, a plurality of tape drives 204 may be available for reading and/or writing tape on the tape reels 202, as shown in FIG. 2A by the leftmost tape drive 204 reading a tape. The tape drives 204 may be located about the surface in any arrangement as would be known to one of skill in the art, preferably such that quick access to the tape drives 204 is possible to reduce loading and data access times.

In one approach, the Linear Media Storage Module 128 may be configured to permit the mobile robot 210 to locate, retrieve, and transport any one selected tape reel 202 to the tape drive 204, and to initialize reading of the tape by the tape drive 204 within about five seconds of receiving a request to read data from the tape of the selected tape reel 202, more preferably within about 2 seconds, and ideally less than about 1 second. In a further approach, the system may include at least one winding station 230 for performing coarse locate operations on the reels prior to the reels being mounted to the at least one linear media drive. In a preferred approach, coarse locate operations may include locating desired portions of the tape stored on a given tape reel in a minimized time.

In several embodiments, several mobile robots 210 move unconstrained along the surface, e.g., two, five, or more. In other embodiments, only a single robot may be present on a given level. It may be advantageous for the mobile robots 210 to be unconnected by cables to any other part of the Linear Media Storage Module 128. This design favors fast robot motion, and facilitates the mobile robots 210 being capable of moving between levels, rooms, enclosures, etc. Also, when multiple mobile robots 210 are used, any problem with cables getting tangled together from different robots 210 is eliminated when the mobile robots 210 are controlled wirelessly.

The mobile robots 210 may have predetermined "resting" locations, as shown by mobile robots 210, according to one embodiment. As shown in FIG. 2A, mobile robot 211 has moved from a resting location, acquired tape reels, and is moving toward a tape drive to load the tape reels in the tape drive for reading tape therefrom. Also, mobile robot 208 has retrieved tape reels from a tape drive which has completed a reading operation, and is returning the tape reels to their storage location. Of course, this movement is exemplary only, and not meant to be limiting on the invention in any way. The mobile robots 210 may retrieve at least one tape reel, but may preferably overlap their tape retrieval operations, depending on the desired embodiment.

The mobile robots 210 may move in straight line increments, or may move more naturally in arcing patterns between positions on the surface, according to various embodiments. Also, the mobile robots 210 may avoid objects in their path according to any method as would be understood by one of skill in the art upon reading the present descriptions.

In some previous tape library geometries, a library gripper accesses an array of tape reels and/or tape cartridges, through motion of a first carriage along a rail or pair of rails. The first carriage in turn holds another set of rails or guides which enables motion of a second carriage holding the gripper. The scheme enables the gripper to access anywhere in two dimensions, where the tape reels or tape cartridges are located. Alternately, in some previous designs, the second carriage has been replaced by a rotary motion which operates about the axes of the first carriage. This scheme limits the flexibility of the library, because grippers (or robots) may interfere with one another. For example, if the grippers use the same set of rails, then they cannot move past each other. Also, there is generally no available space in tape libraries for the installation of an additional set of rails, so this scheme is severely limited in its functionality. In addition, these previous designs do not facilitate easy recovery of access to the tape reels and/or tape cartridges when a gripper fails.

On the other hand, the systems herein use "unconstrained" robots, which facilitate access to the tape reels and/or tape cartridges. Here, the term "unconstrained" indicates that movement is not constrained to rails, tracks, guideways, pathways, etc., but instead movement is free in at least two dimensions, e.g., along a surface. Thus, unconstrained mobile robots are easily added or removed from the surface, and they can easily maneuver around each other along the surface, since they are not fixed to a rail or track.

As shown in FIG. 3, according to one embodiment, the surface across which the mobile robots 210 travel unconstrained may be an upper surface 302 (such as a ceiling in one approach) and may be unpatterned so that the mobile robots 210 are unconstrained, e.g., not limited to motion on particular tracks, paths, rails, etc. Thus each mobile robot 210 is capable of movement independent of movement of any other mobile robot 210, e.g., each mobile robot 210 may cross the path that any other mobile robot 210 has taken or will take. Similarly, by attaching the mobile robot 210 to a surface 302 separate from a surface 304 supporting the tape reels 202, the mobile robots 210 are not constrained to follow aisles, paths, corridors, etc., between groups, columns, rows, etc., of tape reels 202. In one example, this movement may be analogous to the movement of a shopping cart through a supermarket. However, instead of being constrained to moving between the shelves of the supermarket, the mobile robots 210 are capable of moving unconstrained along the ceiling of the supermarket, capable of selecting any desired item from below in the shelves, as an example. The ability to use multiple mobile robots 210 to access a group of tape reels 202 provides faster access of short, popular files. This geometry is much more flexible than previous configurations, in which the tape cartridge grippers were supported on x and y positioners which could not cross paths. The mobile robots 210 may be coupled to the upper surface 302 using magnets 310 or some other coupling or attraction device that biases the mobile robots 210 towards the upper surface 302. By allowing the mobile robots 210 to maneuver on the upper surface 302, the tape reels 202 may simply rest on a lower surface 304, such as a floor. The magnets 310 may bias the mobile robot 210 toward the upper surface 302 with much more force than gravity biases the mobile robot 210 toward the lower surface 304, allowing a much higher frictional force of the mobile robot wheels 306, 308, thereby enabling faster robot acceleration and thus faster seek times.

In one approach, the mobile robot 210 may have three wheels 306, 308: two rear wheels 308 and one front (maneuvering) wheel or ball 306. In another three-wheel configuration, the mobile robot 210 may have two front wheels 308, and a rear (maneuvering) wheel or ball 306. For sake of clarity, a maneuvering wheel in this discussion indicates a wheel whose direction of positioning or rotation with respect to the robot body is not fixed. Of course, the mobile robot 210 may have any number of wheels 306, 308 or other apparatus for causing movement of the mobile robot 210 as would be known to one of skill in the art. For example, one embodiment of the mobile robot 210 may have two drive wheels and two (maneuvering) wheels or balls. Steering of the robot may be accomplished in any known manner, such as by independently driving two of the wheels with a caster-type maneuvering wheel, steering using the maneuvering wheel, and driving and steering with the maneuvering wheel, etc.

The mobile robot 210 may have a reel gripper 312, which when the mobile robot 210 is positioned above a desired tape reel 202 or set of tape reels 202, may grab, attract (for example, magnetically), secure, or otherwise take hold of the tape reel 202 such that it may be loaded into the mobile robot 210 and transported to a tape drive or back from a tape drive to the tape reel's storage location.

With continued reference to FIG. 3, in some embodiments, the mobile robot 210 may have a height such that it may be able to maneuver above the tape reels 202 in a space H of about 1.75", which measures about 1U in a standard rack configuration. The smallest units used for rack-mounted computer components are "1U" units, which are 1.75" high. Since a reel for standard 0.5" wide magnetic tape may be as thin as 0.58", this 1U unit may be thick enough to hold a single layer of storage having a layer of tape reels 202 plus mobile robots 210. Thus a single layer design having mobile robots 210, tape reels 202, and drives may be used for various tape library configurations, ranging from a single layer to multiple stacked layers, which may fill an entire storage room, or any size desired.

In one approach, the plurality of tape reels 202 may be spaced from and located within a distance of about 15 cm from the upper surface, e.g., 15±1.5 cm, less than about 20 cm, less than about 10 cm, less than about 5 cm, or any value in the foregoing ranges.

The Linear Media Storage Module 128 may also comprise a controller 212 for directing movement of the mobile robot 210. The controller 212 may be on board the mobile robot 210, or away from the robot 210 (as shown in FIG. 2A) and in communication therewith via any type of communication channel (such as wireless, wired, infrared, etc.).

According to one illustrative embodiment, a Linear Media Storage Module 128 comprises at least one tape drive 204 configured for reading data from tape stored on one of a plurality of tape reels 202, at least one mobile robot 210 having a volume of less than about 1000 cubic inches (and in some approaches less than about 900 in$^3$, less than about 750 in$^3$, less than about 500 in$^3$, less than about 250 in$^3$, less than about 100 in$^3$, less than about 50 in$^3$) configured for selectively retrieving one or more of the plurality of tape reels 202 and transporting the one or more retrieved tape reels 202 to the tape drive 204. The mobile robot 210 moves along a surface, and is preferably not mechanically constrained to move along a pre-determined trackway or path (i.e., it is unconstrained). In some approaches, the mobile robot 210 may be mechanically unconstrained and may be able to move autonomously across the surface via any desired path.

To assist in navigation of the mobile robot 210, at least one of the lower and upper surfaces may include an optical pattern usable for navigation of the mobile robot 210, and the mobile robot 210 may be configured for recognizing the optical pattern.

Figure 4A:
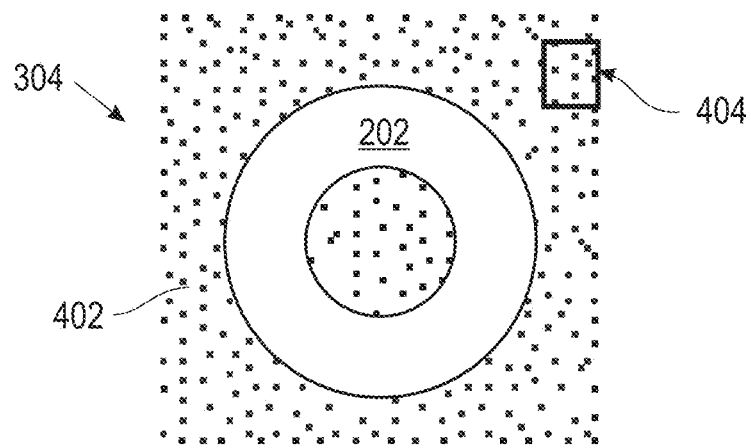
FIG. 4A is an illustration of an optical pattern on a surface, according to one embodiment.

As shown in FIG. 4A, the lower surface or floor 304, for example, may include an optical pattern 402 designed for the mobile robot to locate its position. This optical pattern 402 may be a rectangular grid extending over the entire floor 304, with each grid square 404 labeled with readable code identifying the row and column of the particular grid square 404. This readable code may take any form as would be understood by one of skill in the art.

Figure 4B:
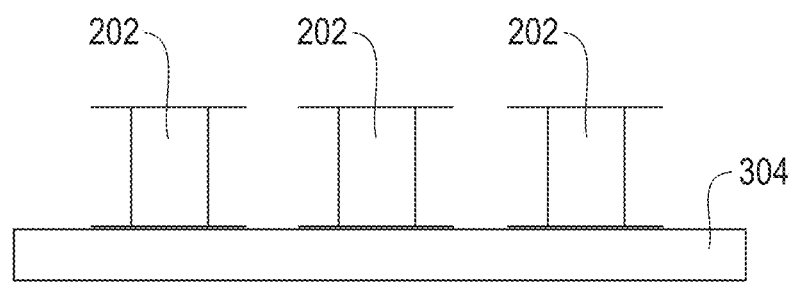
FIG. 4B is a partial side view of a surface design, according to one embodiment.
Figure 4C:
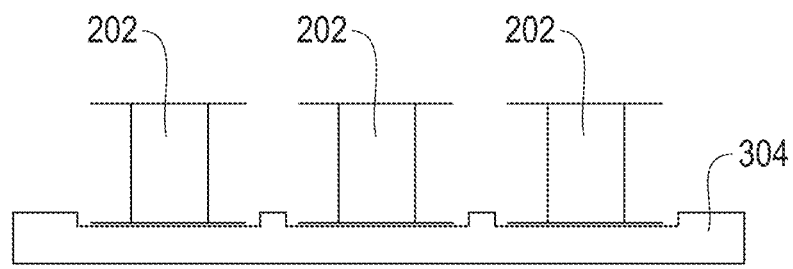
FIG. 4C is a partial side view of a surface design, according to one embodiment.
Figure 4D:
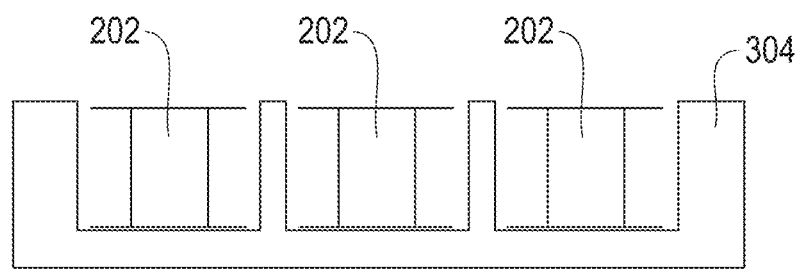
FIG. 4D is a partial side view of a surface design, according to one embodiment.
Figure 4E:
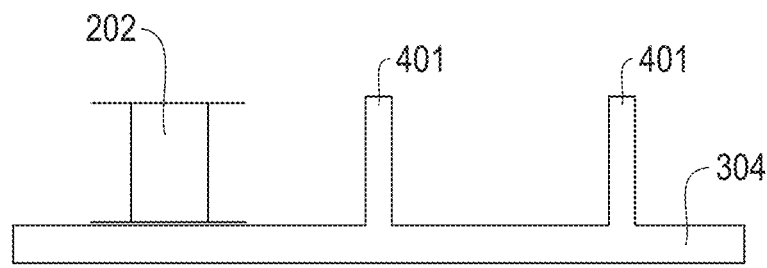
FIG. 4E is a partial side view of a surface design, according to one embodiment.

The floor 304 may be planar, as shown in FIG. 4B, covered with small indentations as shown in FIG. 4C, or have a lattice defining receptacle areas in which the tape reels 202 are positioned as shown in FIG. 4D, according to various embodiments. By extending the lattice up past the tape reels 202, it may form a surface on which the mobile robot 210 may be supported, and the mobile robots 210 would not maneuver along the upper surface but instead would maneuver on the lower surface formed by the top surface of the lattice, according to one embodiment. In another approach, as shown in FIG. 4E, posts 401 may extend upwardly from the lower surface 304 to hold reels in place. The posts 401 may be used in combination with other approaches, such as those shown in FIGS. 4B and 4C.

Figure 5A:
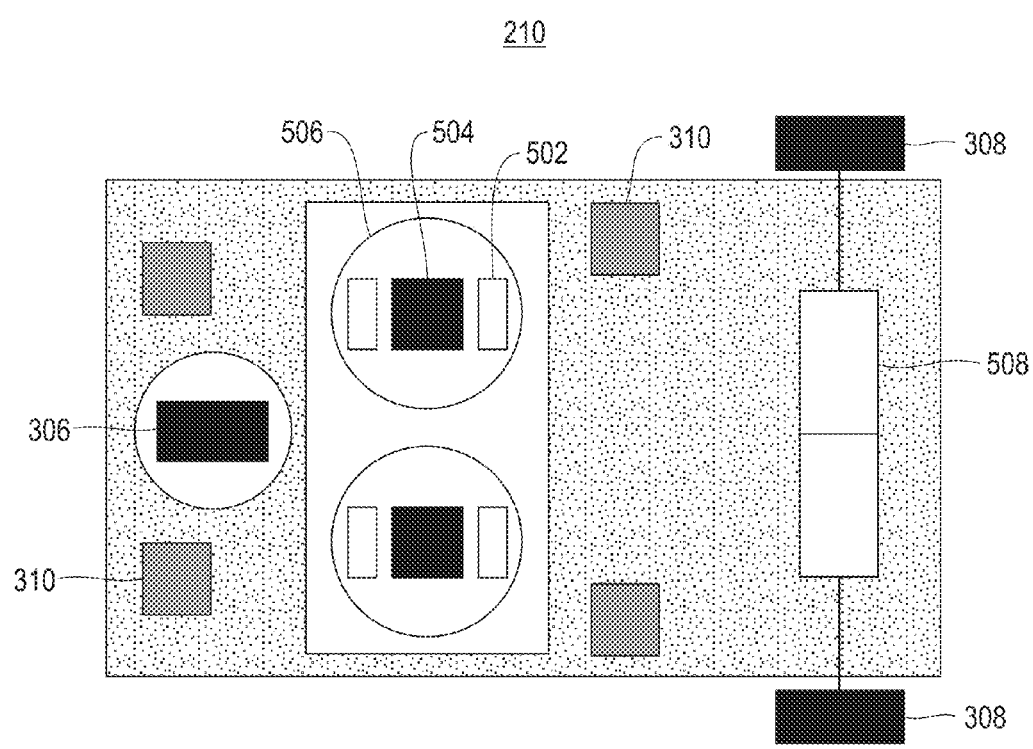
FIGS. 5A-5B are detailed views of a mobile robot, according to one embodiment.
Figure 5B:
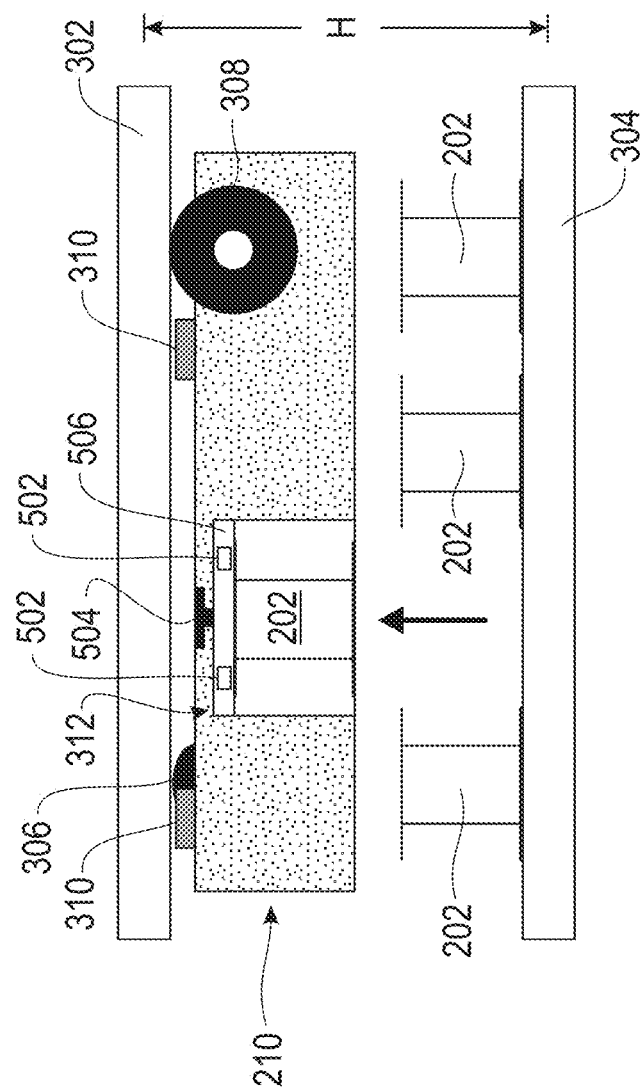

The design of the mobile robot 210 may include additional features, abilities, etc., as would be understood by one of skill in the art upon reading the present descriptions. In one embodiment, a mobile robot 210 is shown in FIGS. 5A-5B, according to one approach. In this example, one or more motors 508 power symmetric drives wheels 308 that allow forward and backward motion, and in a further approach, the drive wheels 308 may provide steering if the drive wheels 308 are operated independently using two symmetric drive motors 508. These motors 508 may be attached to each wheel 308 by a single step-down gear. The mobile robot 210 may additionally be supported by one or more other omni-directional passive wheels 306, which may move in any direction, and may be maneuverable (e.g., steerable, positionable, etc.), in some approaches. The omni-directional wheel(s) 306 may be caster wheels, and more preferably may be spherical balls which are also referred to as ball transfers.

To pick up the tape reel(s) 202, a simple platform 312 may be lowered and raised by a solenoid or motor (not shown). If the tape reels 202 are topped by a magnetic plate, the tape reels 202 may be gripped to the platform 312 by energizing electromagnets 502. One or more cameras 504 may allow for navigation of the mobile robot 210. A camera 504 may be placed above each reel holding position 506, enabling the mobile robot 210 to determine its position and to deliver a tape reel 202 directly into a tape drive. The mobile robot 210 need not be made precisely, because the cameras 504 may simultaneously image the tape reels 202 and location grid (or the tape reel chucks on the drive) to precisely position the tape reels 202, in some approaches.

To enable multiple mobile robots 210 to work in the same work space, such as the same floor, there are preferably no cables attached to the mobile robots 210. The mobile robot 210 uses little power, and a peak speed of about 2 m/s in some embodiments is sufficient to pick up the tape reel 202 and bring it to the drive within a half second. For a 150 gram mobile robot 210, the corresponding kinetic energy would be about 0.3 Joule. This amount of energy may be supplied by a rechargeable battery, through inductive coupling, etc., but a capacitor, with its extremely long lifetime, may be preferable. In one embodiment, an 80 volt, 1000 µF electrolytic capacitor which includes 3.2 Joules, yet is only 16 mm diameter by 40 mm long may be used. The mobile robot 210 may be recharged at its parking position, or at the tape drive when it loads the tape reel 202. In addition, the robot may also obtain power for operation and/or charging via contacting a surface which includes power distribution capability of a type known in the art. The robot may also obtain power for operation and/or control information via a tether.

As shown in FIG. 5B, according to a preferred embodiment, the tape reels 202 are positioned on a floor 304, the surface 302 is opposite the floor 304, and the mobile robot 210 is biased toward the surface 302, such as through magnetic biasing (by using magnets 310), thereby suspending the mobile robot 210 above the tape reels 202. For example, the mobile robot 210 may be magnetically biased toward the upper surface 302.

Figure 6A:
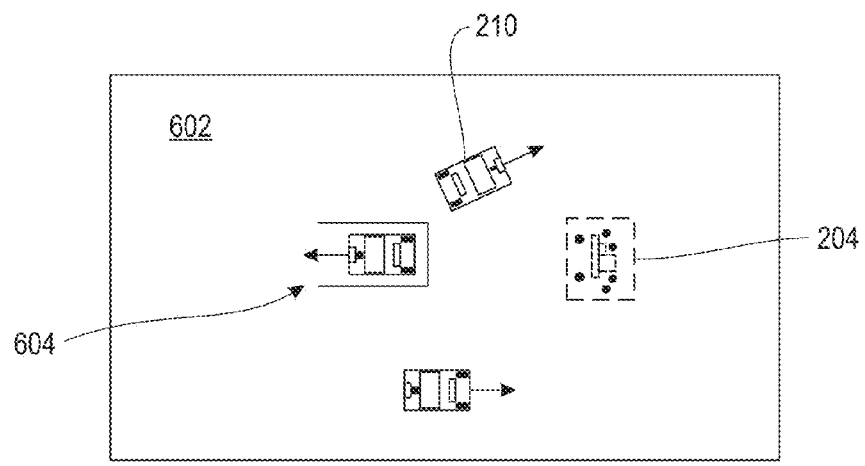
FIGS. 6A-6B are simplified views of a tape library using mobile robots, according to one embodiment.
Figure 6B:
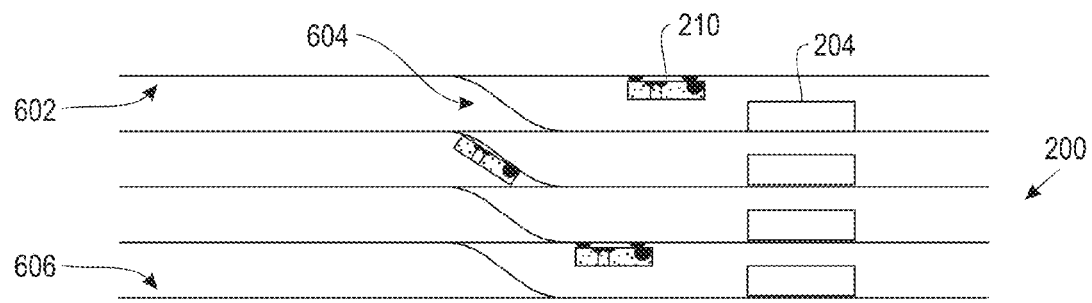

As shown in FIGS. 6A-6B, a library controller may communicate with the mobile robots 210 by light, such as infrared (IR); radio frequency (RF); etc., and may be differentiated on each level of the Linear Media Storage Module 128 to avoid cross-talk. The library controller computes a path the mobile robot 210 is to take to pick up and drop off the tape reels and load the tape reels in the tape drives 204. The mobile robot 210 may servo along the path by using its cameras, in one approach, or it may use encoders on its motors or wheels to servo, using the cameras only for fine adjustments, in another embodiment.

In one embodiment, the Linear Media Storage Module 128 may comprise a plurality of tape drives 204, where each tape drive 204 is positioned on the floor supporting the tape reels, the floor being below the surface on which the mobile robots 210 maneuver by a distance sufficient to allow movement of the mobile robots 210 therebetween (between the tape reels and the surface).

In large multilayer Linear Media Storage Modules 128, mobile robots 210 may move between floors using ramps 604. This enables the mobile robots 210 themselves to load different floors with tape reels, and to rebalance the work load by optimally locating the mobile robots 210 and organizing the tape reels. The relative number of mobile robots 210, tape reels, and tape drives 204 may be determined by the access frequency of the files, data, etc.

According to one approach, multiple surfaces having a spaced and stacked configuration may be used, and the mobile robot 210 is configured to travel between the multiple surfaces. In this approach, at least one ramp 604 may be provided, connecting at least two of the multiple surfaces, thereby permitting the mobile robot 210 to travel between the multiple surfaces. In various approaches, there may be no cable coupled between the mobile robot 210 and any other component of the system, thereby facilitating travel of the mobile robot 210 between the multiple surfaces.

As illustrated in FIG. 6B, according to one embodiment, one or more tape drives 204 may be secured directly to the floors 606 of a Linear Media Storage Module 128 having one or more levels. In addition, the mobile robots 210 may be attracted to the ceilings 602. In this design, the drive(s) 204 may be easily positioned at any location in the Linear Media Storage Module 128 by simply leaving space in the array of reels (not shown). This arrangement facilitates reconfiguration of the Linear Media Storage Module 128 after it has been manufactured, along with replacement of failed tape drives should they occur. For example, the mobile robots 210 may be adapted for moving and/or relocating a tape drive 204. At least one tape drive 204 may be positioned on each level of the Linear Media Storage Module 128, according to one embodiment.

The library can be configured to have "spare" tape drives 204 and mobile robots 210 ready to be put into use upon failure of other tape drives and mobile robots, according to one embodiment. In another embodiment, when extra tape drives 204 or mobile robots 210 are to be used, due to some factor, such as an increased work load, failed mobile robots and/or tape drives, etc., the Linear Media Storage Module 128 may allow adding or removing tape drives, tape reels, and/or mobile robots by the user after manufacture of the Linear Media Storage Module 128.

Any type of tape threading system known in the art may be adapted for use with the systems described herein, according to various embodiments. For example, if tape reels are used individually (not as pairs), a standard threader mechanism may be used to thread the tape reel onto the tape drive, according to one embodiment. Storing the tape on pairs of reels has an advantage in that after loading, the tape is ready to be used and does not need to be wound onto another inboard reel. Also, when the tape is finished being used, both reels may be removed with the tape, and the tape does not need to be unwound from the inboard reel in order to be removed.

Figure 7A:
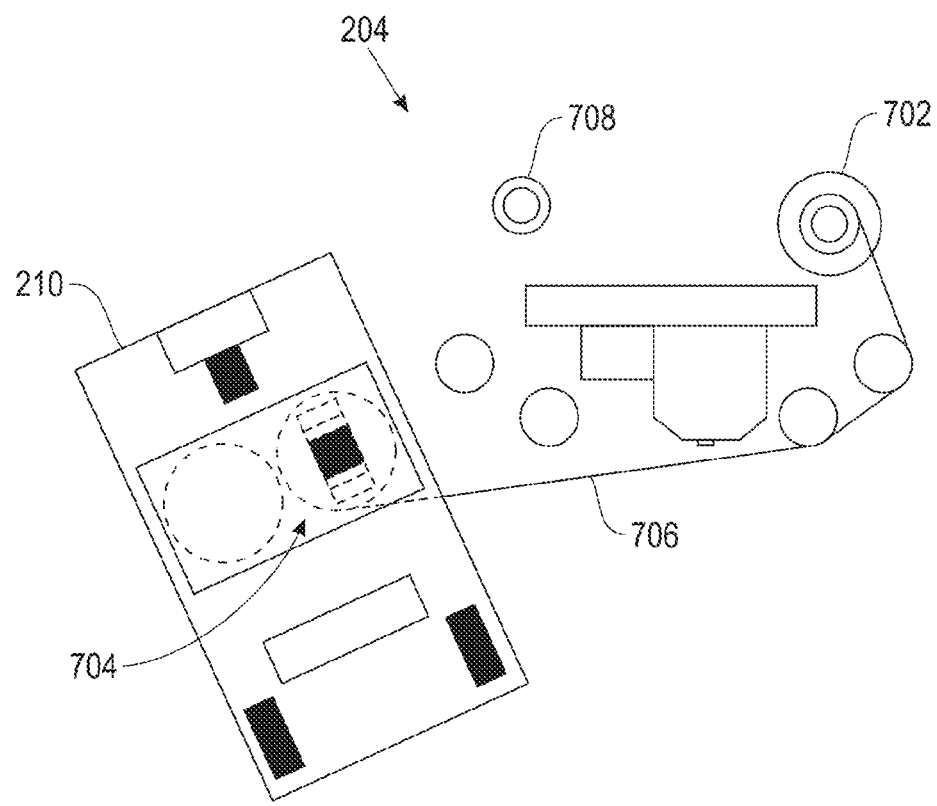
FIGS. 7A-7D are schematic representations of tape threading using a mobile robot, according to one embodiment.

In another embodiment, as shown in FIG. 7A, the tape drive 204 itself may have no threader. Rather, the mobile robot 210 may be configured to thread tape 706 of the retrieved tape reel 702 onto the tape drive 204. In one approach, a mobile robot 210 loads the tape 706 provided on a pair of tape reels 704, 704, by first dropping off one reel 702 on the tape drive 204, and then the other reel 704 on a reel chuck 708, for which a reel motor may wind the tape 706. Alternately, if the tape 706 is stored on one reel only (such as reel 702), the mobile robot 210 may move an end of the tape not on the reel 702 to secure it to the inboard drive wheel, as described in relation to FIGS. 7B-7D. The precision of the mobile robot 210 motion may be much greater than that of a leader pin loader mechanism currently used in tape drives, in some approaches.

Figure 7B:
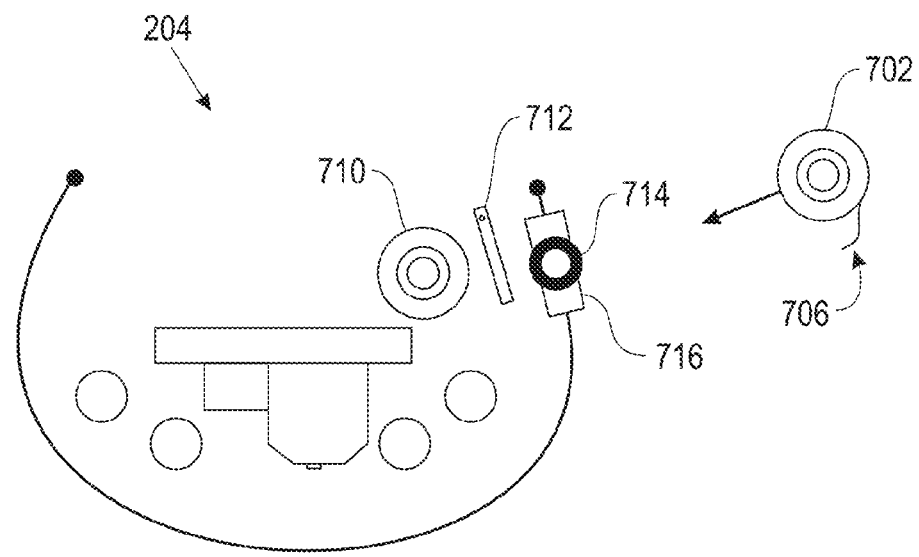
Figure 7C:
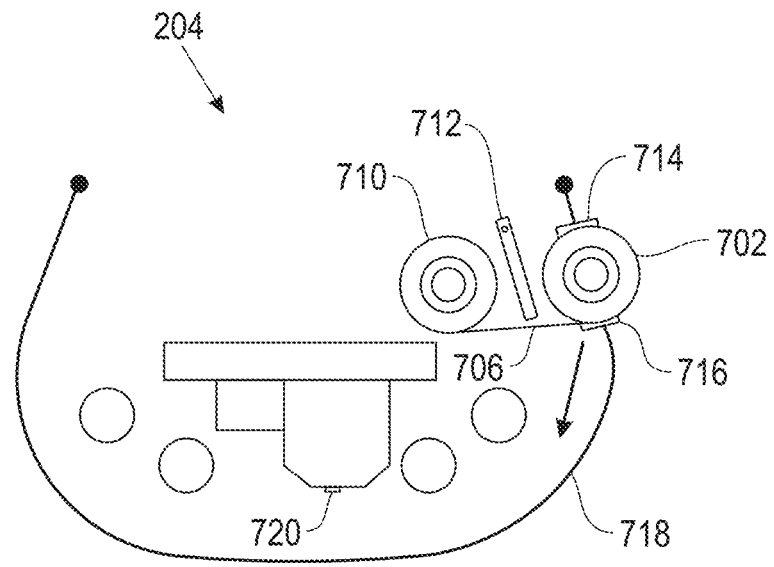
Figure 7D:
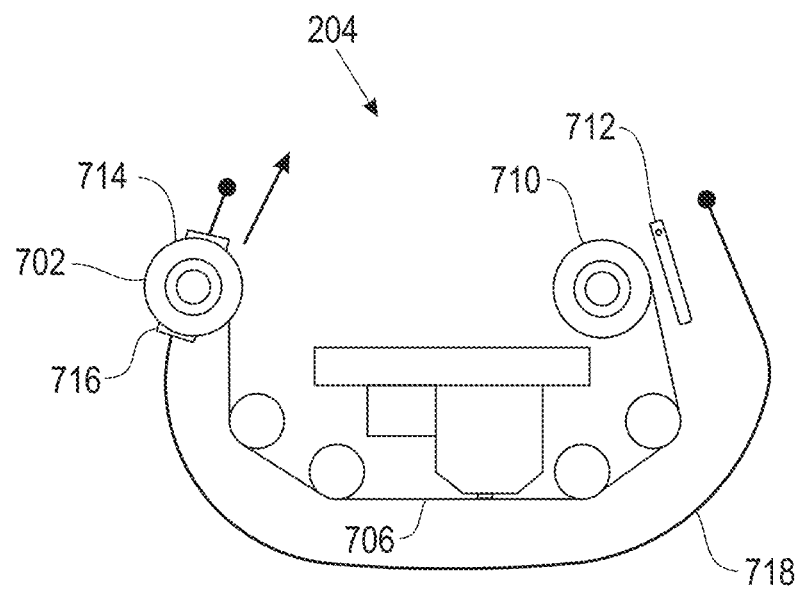

In another embodiment, as shown in FIGS. 7B-7D, a single reel 702 of tape 706 may be loaded onto a reel chuck and motor 714 which are fixed to a carriage 716 that is adapted to follow a guide 718 that allows for motion of the chuck 714 around the tape drive 204 to facilitate threading of the tape 706. Before loading the reel 702 on the chuck 714, the chuck 714 is brought into proximity of the inboard (take-up) reel 710, as shown in FIG. 7B. After the mobile robot (not shown for clarity) places the reel 702 on the chuck 714, a mechanism 712 attaches the end of the tape 706 to the take-up reel 710. See FIG. 7C. At this point, the tape 706 may be transferred between reels 702 and 710 as part of a preliminary locate operation, before the tape 706 contacts the recording head 720 or any guide surfaces, such as rollers, thus enabling faster tape locate with reduced tape damage and drive wear. Then, the chuck and reel motor 714 and tape reel 702 are moved along the guide 718 to a final position, as shown in FIG. 7D, where the tape 706 may be read from or written to.

In another embodiment, rather than moving the library reel 702 and carriage 716, the take-up reel 710 and its motor may be moved to thread the tape drive 204. In yet another embodiment, if the tape 706 is stored on a pair of reels, the mobile robot may position the two reels directly on the tape drive 204, where the tape 706 may be located before threading.

Figure 8A:
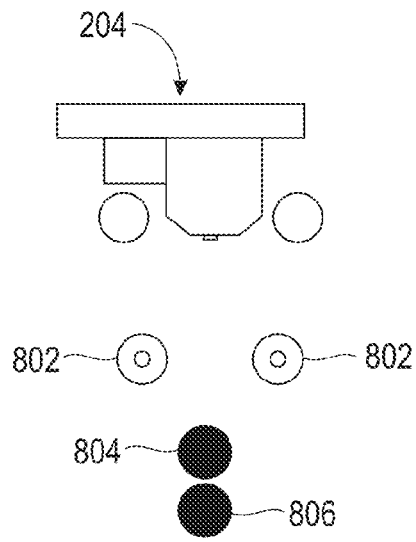
FIGS. 8A-8D are schematic representations of steps for tape self-threading using a tape drive, according to one embodiment.
Figure 8B:
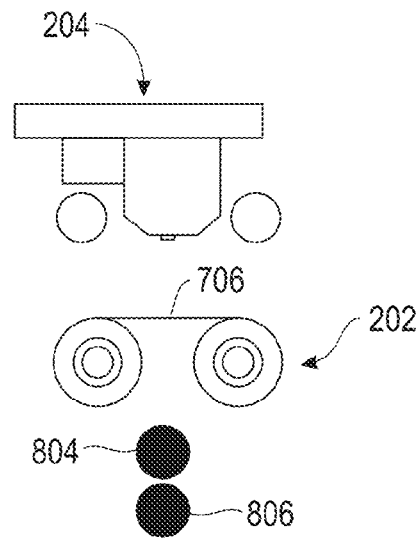
Figure 8C:
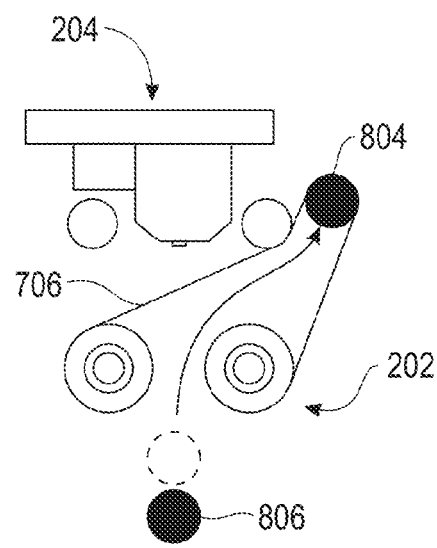
Figure 8D:
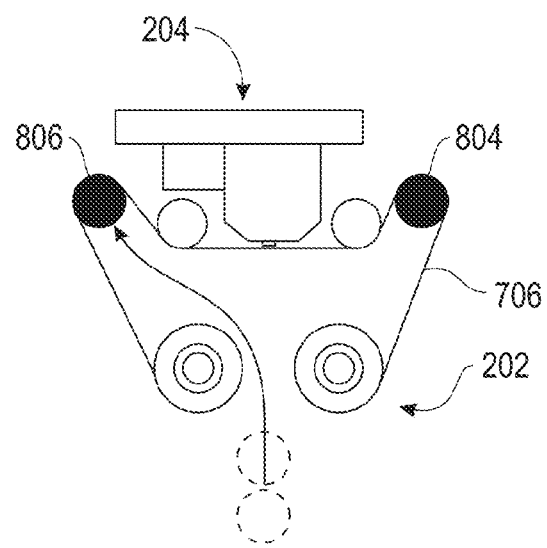

Alternatively, as shown in FIGS. 8A-8D, the tape 706 may be held on two tape reels 202, and a method may be used which avoids the unreliability of a leader pin. In this approach, the reel drive chucks 802 may be spaced with the same close spacing of the tape reels 202 in their storage position. The mobile robot places the tape reels 202 on the chucks 802, as shown in FIG. 8B, and two moveable rollers 804, 806 sequentially thread the tape 706 in position. First, roller 804 threads the tape 706, as shown in FIG. 8C, and then roller 806 threads the tape 706, as shown in FIG. 8D. The tape 706 may locate before the rollers 804, 806 move into their final position, thus avoiding the extra wear and control difficulties associated with contact of the tape 706 with the roller 806 or other guide surfaces and the head. Alternately, two smooth cylinders which form air bearings may be used to thread the tape drive, in another embodiment.

In one embodiment, each reel may be large enough (e.g., the flanges are big enough) to hold the entire length of tape, if all the tape is to be accessed. If the tape is stored in pairs of these large reels, the capacity of the library may be reduced by a factor of two from what it may be by using single reels.

Figure 9A:
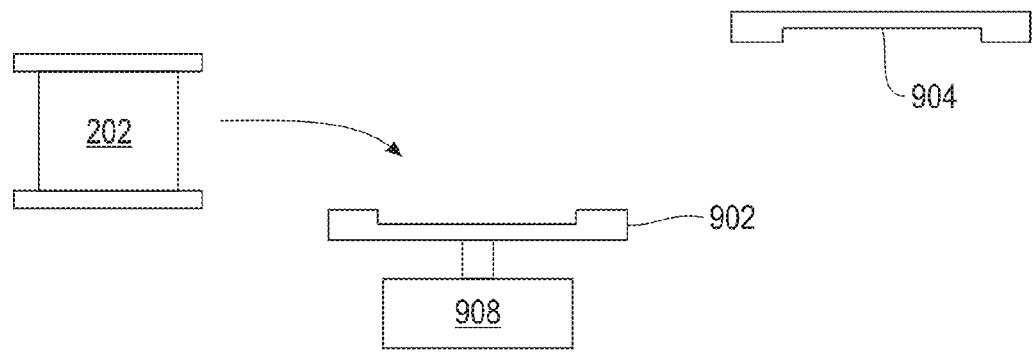
FIGS. 9A-9C are schematic representations of steps using flange extenders, according to one embodiment.
Figure 9B:
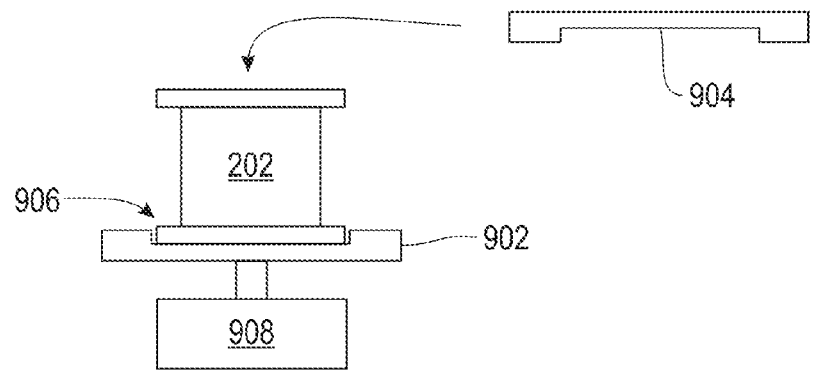
Figure 9C:
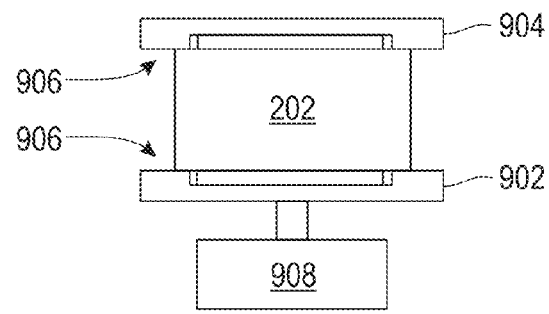

In another approach, the tape may be stored on a pair of reels, where at least one reel is not large enough to accept the entire length of tape. As shown in FIGS. 9A-9C, a reel-size reduction may be effected by incorporating temporary flange extenders 902, 904 in the tape drive. In the tape drive, a temporary flange extender 902 is fixed to the motor/reel chuck 908 so that the reel flange 906 is extended when it is on the drive. Once the reels 202 are in the drive, another flange extender 904 is placed on the top of each of the reels 202, so that tape can be spooled onto one of the reels. Before the tape reels 202 are unloaded from the tape drive, the tape is spooled back evenly between the tape reels 202, so that it lies only between the permanent flanges 906 on the tape reels 202.

In another approach, a packing roller may be used to keep the tape on the reel after its diameter becomes bigger than the flange.

In some approaches, the tape library may be fault tolerant and/or self-repairing. For example, each tape cartridge may be read by a number of different drives, if a robot fails then other robots may maneuver around the failed robot, a failed robot may be towed away by another robot and replaced, and/or a failed tape drive may be towed away and replaced.

According to one embodiment, if a mobile robot fails, it may be towed away and replaced by another mobile robot. The tape drives may be configured so that a mobile robot may easily tow away and replace a tape drive, after temporarily clearing away the tape reels that may be in the path taken to remove the tape drive. The power and data connections may be made to use very little force, for example, using simple sliding spring contacts for the power and optical link for the tape drive data transfer.

According to one embodiment, the system may be configured to allow removal of a failed mobile robot using another mobile robot, in which case the failed mobile robot may then be replaced with the mobile robot performing the removing or another mobile robot, in some approaches.

In another embodiment, the mobile robot may be configured to remove the tape drive, e.g., if the tape drive is broken. Likewise, the robot may install a replacement or repaired tape drive.

Any of the embodiments described and/or suggested herein may be combined with various functional methods, depending on the desired embodiment.

Figure 10A:
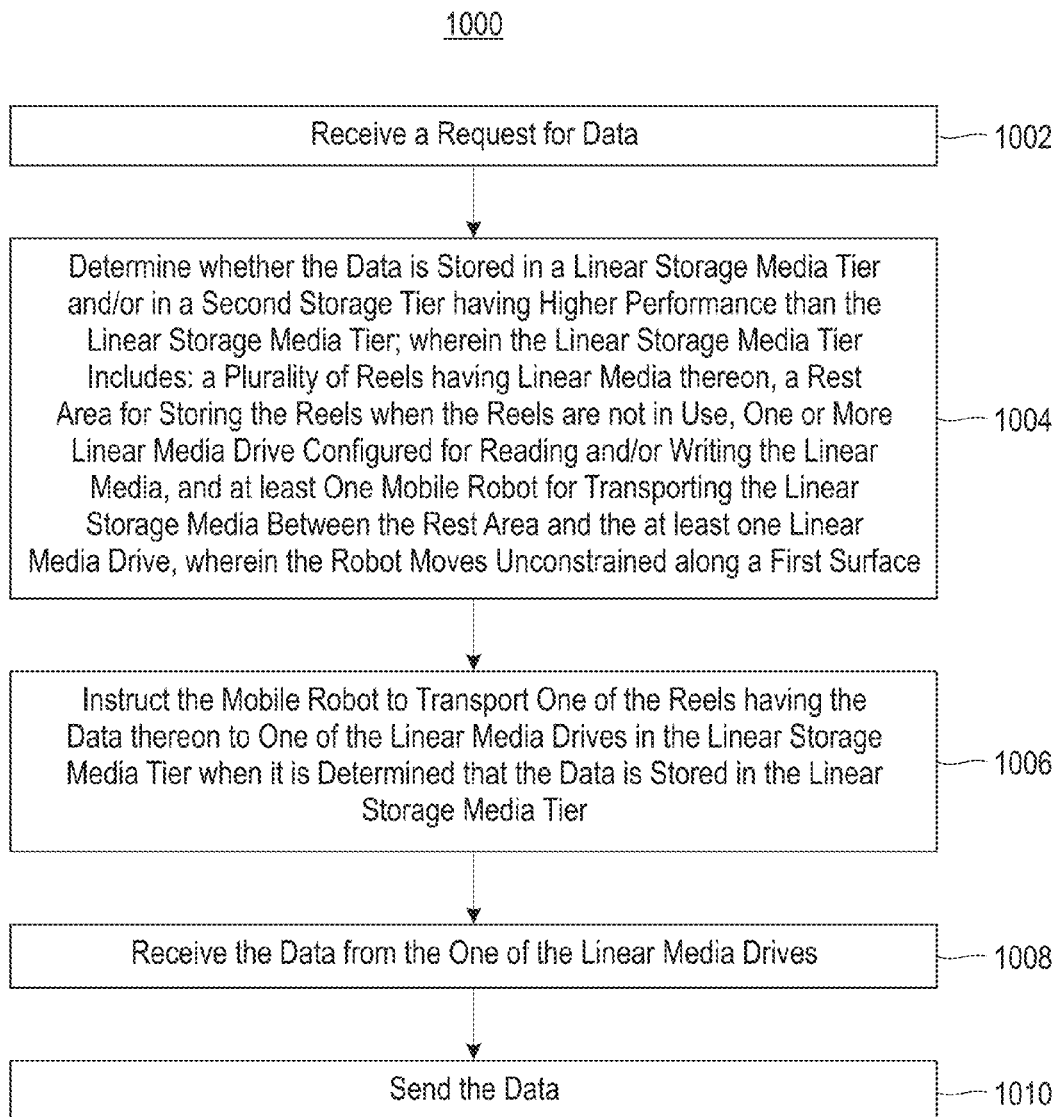
FIG. 10A is a flow diagram of a method according to one embodiment.

FIG. 10A depicts a method 1000 for retrieving data from a tiered media storage system, in accordance with one embodiment. As an option, the present method 1000 may be implemented in conjunction with features from any other embodiment listed herein, such as those described with reference to the other FIGS. Of course, however, such method 1000 and others presented herein may be used in various applications and/or in permutations which may or may not be specifically described in the illustrative embodiments listed herein. Further, the method 1000 presented herein may be used in any desired environment.

Referring now to FIG. 10A, the method 1000 includes receiving a request for data as illustrated in operation 1002. According to various approaches, the data may include any data or form of data described and/or suggested herein.

Moreover, operation 1004 of method 1000 includes determining whether the data is stored in a linear storage media tier and/or in a second storage tier having higher performance than the linear storage media tier as described herein. In a preferred embodiment, the linear storage media tier includes: a plurality of reels having linear media thereon, a rest area for storing the reels when the reels are not in use, one or more linear media drive configured for reading and/or writing the linear media, and at least one mobile robot for transporting the linear storage media between the rest area and the at least one linear media drive, wherein the robot moves unconstrained along a first surface.

Furthermore, method 1000 additionally includes instructing the mobile robot to transport one of the reels having the data thereon to one of the linear media drives in the linear storage media tier when it is determined that the data is stored in the linear storage media tier. See operation 1006.

With continued reference to FIG. 10A, operation 1008 of method 1000 includes receiving the data from the one of the linear media drives; while operation 1010 includes sending the data e.g., to the requestor.

Figure 10B:
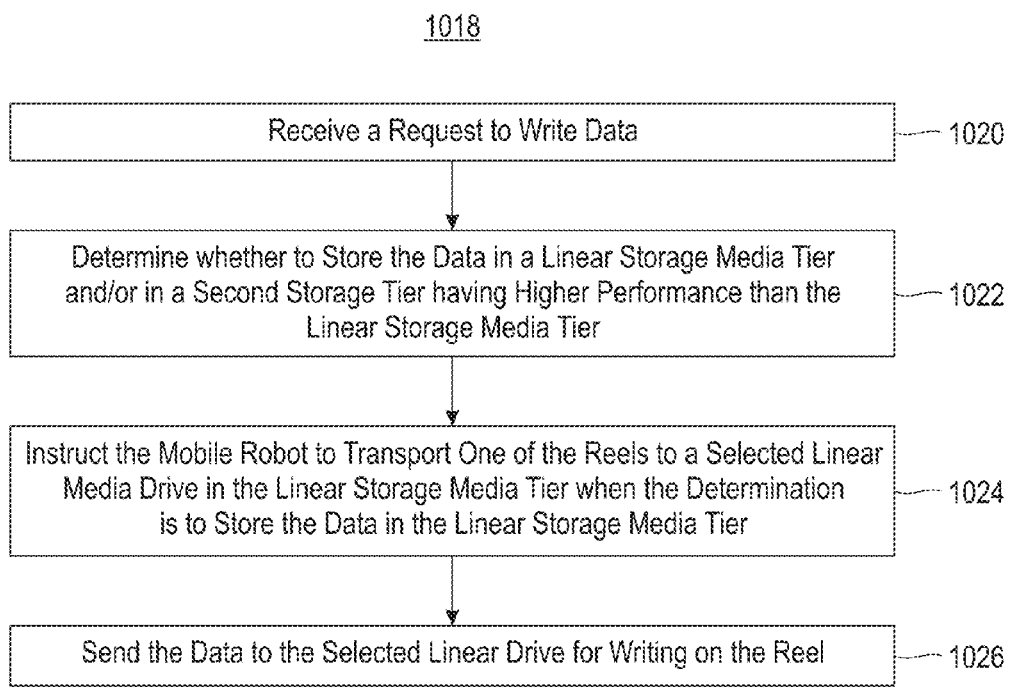
FIG. 10B is a flow diagram of a method according to one embodiment.

FIG. 10B depicts a method 1018 for retrieving data from a tiered media storage system, in accordance with one embodiment. As an option, the present method 1018 may be implemented in conjunction with features from any other embodiment listed herein, such as those described with reference to the other FIGS. Of course, however, such method 1018 and others presented herein may be used in various applications and/or in permutations which may or may not be specifically described in the illustrative embodiments listed herein. Further, the method 1018 presented herein may be used in any desired environment.

In operation 1020 of FIG. 10B, a request to write data is received. In operation 1022, a determination is made as to whether to store the data in a linear storage media tier and/or in a second storage tier having higher performance than the linear storage media tier as described herein. In a preferred embodiment, the linear storage media tier includes: a plurality of reels having linear media thereon, a rest area for storing the reels when the reels are not in use, one or more linear media drive configured for reading and/or writing the linear media, and at least one mobile robot for transporting the linear storage media between the rest area and the at least one linear media drive, where the robot moves unconstrained along a first surface.

Referring to operation 1024, the mobile robot is instructed to transport one of the reels to a selected linear media drive in the linear storage media tier when the determination is to store the data in the linear storage media tier. In operation 1026, the data is sent to the selected linear media drive for writing on the reel.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as "logic," "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

FIG. 11 illustrates a network architecture 1100, in accordance with one embodiment. As an option, the network architecture 1100 may be implemented in conjunction with features from any other embodiment listed herein, such as those described with reference to the other FIGS. Of course, however, such network architecture 1100 and others presented herein may be used in various applications and/or in permutations which may or may not be specifically described in the illustrative embodiments listed herein.

Further, the network architecture 1100 presented herein may be used in any desired environment.

As shown in FIG. 11, a plurality of remote networks 1102 are provided including a first remote network 1104 and a second remote network 1106. A gateway 1101 may be coupled between the remote networks 1102 and a proximate network 1108. In the context of the present network architecture 1100, the networks 1104, 1106 may each take any form including, but not limited to a LAN, a WAN such as the Internet, public switched telephone network (PSTN), internal telephone network, etc.

In use, the gateway 1101 serves as an entrance point from the remote networks 1102 to the proximate network 1108. As such, the gateway 1101 may function as a router, which is capable of directing a given packet of data that arrives at the gateway 1101, and a switch, which furnishes the actual path in and out of the gateway 1101 for a given packet.

Further included is at least one data server 1114 coupled to the proximate network 1108, and which is accessible from the remote networks 1102 via the gateway 1101. It should be noted that the data server(s) 1114 may include any type of computing device/groupware. Coupled to each data server 1114 is a plurality of user devices 1116. Such user devices 1116 may include a desktop computer, lap-top computer, hand-held computer, printer or any other type of logic. It should be noted that a user device 1111 may also be directly coupled to any of the networks, in one embodiment.

A peripheral 1120 or series of peripherals 1120, e.g., facsimile machines, printers, networked and/or local storage units or systems, etc., may be coupled to one or more of the networks 1104, 1106, 1108. It should be noted that databases and/or additional components may be utilized with, or integrated into, any type of network element coupled to the networks 1104, 1106, 1108. In the context of the present description, a network element may refer to any component of a network.

According to some approaches, methods and systems described herein may be implemented with and/or on virtual systems and/or systems which emulate one or more other systems, such as a UNIX system which emulates an IBM z/OS environment, a UNIX system which virtually hosts a MICROSOFT WINDOWS environment, a MICROSOFT WINDOWS system which emulates an IBM z/OS environment, etc. This virtualization and/or emulation may be enhanced through the use of a hypervisor, in some embodiments.

In more approaches, one or more networks 1104, 1106, 1108, may represent a cluster of systems commonly referred to as a "cloud." In cloud computing, shared resources, such as processing power, peripherals, software, data, servers, etc., are provided to any system in the cloud in an on-demand relationship, thereby allowing access and distribution of services across many computing systems. Cloud computing typically involves an Internet connection between the systems operating in the cloud, but other techniques of connecting the systems may also be used.

Figure 12:
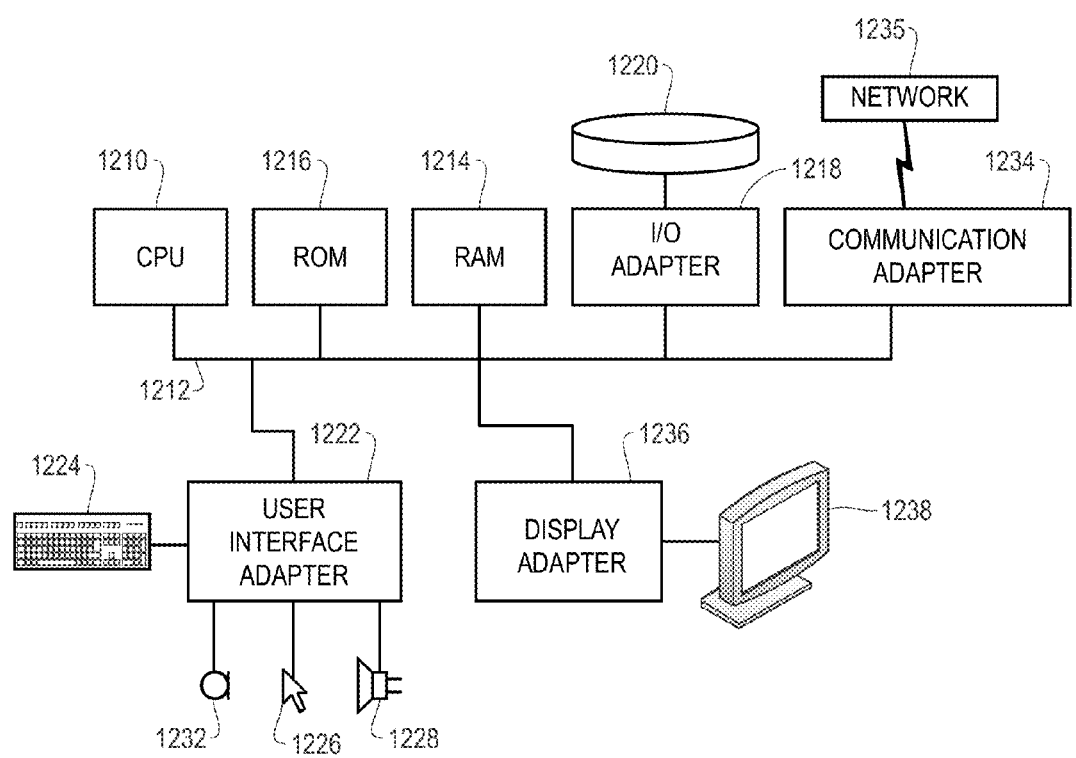
FIG. 12 is a system diagram of a representative hardware environment that may be associated with the servers and/or clients of FIG. 11, in accordance with one embodiment.

FIG. 12 shows a representative hardware environment associated with a user device 1116 and/or server 1114 of FIG. 11, in accordance with one embodiment. Such figure illustrates a typical hardware configuration of a workstation having a central processing unit 1210, such as a microprocessor, and a number of other units interconnected via a system bus 1212.

The workstation shown in FIG. 12 includes a Random Access Memory (RAM) 1214, Read Only Memory (ROM) 1216, an I/O adapter 1218 for connecting peripheral devices such as disk storage units 1220 to the bus 1212, a user interface adapter 1222 for connecting a keyboard 1224, a mouse 1226, a speaker 1228, a microphone 1232, and/or other user interface devices such as a touch screen and a digital camera (not shown) to the bus 1212, communication adapter 1234 for connecting the workstation to a communication network 1235 (e.g., a data processing network) and a display adapter 1236 for connecting the bus 1212 to a display device 1238.

The workstation may have resident thereon an operating system such as the Microsoft Windows® Operating System (OS), a MAC OS, a UNIX OS, etc. It will be appreciated that a preferred embodiment may also be implemented on platforms and operating systems other than those mentioned. A preferred embodiment may be written using JAVA, XML, C, and/or C++ language, or other programming languages, along with an object oriented programming methodology. Object oriented programming (OOP), which has become increasingly used to develop complex applications, may be used.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It will be clear that the various features of the methodologies and embodiments described herein may be combined in any way, creating a plurality of combinations from the descriptions presented herein.

Communications components such as input/output or I/O devices (including but not limited to keyboards, displays, pointing devices, etc.) may be coupled to the system either directly or through intervening I/O controllers.

Communications components such as buses, interfaces, network adapters, etc., may also be coupled to the system to enable the data processing system, e.g., host, to become coupled to other data processing systems, remote printers, storage devices, etc., through intervening private or public networks. Modems, cable modems, and Ethernet cards are just a few of the currently available types of network adapters that maybe used, in some approaches.

It will be further appreciated that embodiments described herein may be provided in the form of a service deployed on behalf of a customer to offer service on demand.

While various embodiments have been described above, it should be understood that they have been presented by way of example only, and not limitation. Thus, the breadth and scope of an embodiment of the present invention should not be limited by any of the above-described exemplary embodiments, but should be defined only in accordance with the following claims and their equivalents.

What is claimed is:

1. A computer-implemented method, comprising:
   receiving a request for data;
   determining whether the data is stored in a system comprising a linear storage media tier and/or in a second storage tier having higher performance than the linear storage media tier;
   wherein the linear storage media tier includes:
      a plurality of reels having linear media thereon;
      a rest area for storing the reels when the reels are not in use;
      at least one linear media drive configured for reading and/or writing the linear media; and
      at least one mobile robot for transporting the linear storage media between the rest area and the at least one linear media drive, wherein the robot moves unconstrained along a first surface and wherein the first surface is unpatterned;
   instructing the mobile robot to transport one of the reels having the data thereon to one of the linear media drives in the linear storage media tier when it is determined that the data is stored in the linear storage media tier;
   receiving the data from the one of the linear media drives; and
   sending the data.

2. The method of claim 1 wherein the rest area includes a horizontal surface where the reels are stored when the reels are not in use, the rest area having a mechanism for selectively moving the reels vertically for engagement with the at least one mobile robot.

3. The method of claim 1 wherein a performance of the linear storage media tier is characterized by having a read access time to a block of data stored on a reel in the rest area in less than 10 seconds.

4. The method of claim 1, wherein the request includes a disk storage command from a disk storage interface, wherein access performance of the linear storage media tier is characterized by allowing data to be retrieved from anywhere in the system within an access time limit of the disk storage interface.

5. The method of claim 1, further comprising:
   receiving random access input write data; and converting the random access input write data to sequential data when written to the linear media;
   accumulating the write data prior to being moved to the linear storage media tier, wherein the accumulated write data are associated with several random access write requests in the second storage tier; and
   wherein the accumulated write data in the second storage tier are written to the linear media such that at least an integer number of full wraps are written to the linear media in a single pass.

6. The method of claim 1, wherein the first surface is a ceiling of the linear storage media tier, and wherein the rest area is positioned on a floor of the linear storage media tier opposite the first surface.

7. The method of claim 1, wherein the at least one mobile robot is magnetically coupled to the first surface.

8. The method of claim 1, wherein the linear storage media tier includes at least two drives;
   wherein a first subset of the at least two drives is optimized for writing;
   wherein a second subset of the at least two drives is optimized for reading;
   wherein at least one of the second subset of the at least two drives is a read-only drive; and
   wherein read operations are directed to drives not performing write operations.

9. The method of claim 1, wherein the linear storage media tier comprises multiple levels, each level comprising:
   an upper surface along which the at least one mobile robot moves unconstrained; and
   a lower surface comprising a rest area for storing the reels when the reels are not in use.

10. The method of claim 1, wherein the at least one mobile robot moves unconstrained along the first surface by hanging from an underside of the first surface and driving the at least one mobile robot using a plurality of wheels in contact with the underside of the first surface.

11. The method of claim 1, wherein the linear storage media tier includes a plurality of mobile robots, and further comprising utilizing the plurality of robots in overlapping operations to increase a data throughput of the system.

12. The method of claim 1, further comprising performing coarse locate operations on the reels at a winding station prior to the reels being mounted to the one or more linear media drives.

13. The method of claim 1, further comprising maintaining in a mapping module a map of data on the linear media in the second storage tier such that a location of a block of data on the linear media can be determined without reading the linear media.

14. A computer-implemented method, comprising:
   receiving a request to write data;
   determining whether to store the data in a linear storage media tier and/or in a second storage tier having higher performance than the linear storage media tier;
   wherein the linear storage media tier includes:
      a plurality of reels having linear media thereon;
      a rest area for storing the reels when the reels are not in use;
      at least one linear media drive for reading and/or writing the linear media;
      a first surface;
      a second surface vertically opposite and substantially parallel to the first surface, the second surface comprising the rest area; and
      at least one mobile robot for transporting the linear storage media between the rest area and the at least one linear media drive, wherein the robot moves unconstrained along the first surface, and wherein the at least one mobile robot and the reels are located between the first surface and the second surface;
   instructing the mobile robot to transport one of the reels to a selected linear media drive in the linear storage media tier when the determination is to store the data in the linear storage media tier; and
   sending the data to the selected linear media drive for writing on the reel.

15. The method of claim 14, further comprising:
   receiving random access input write data; and converting the random access input write data to sequential data when written to the linear media;
   accumulating the write data associated with several random access write requests in the second storage tier prior to being moved to the linear storage media tier; and wherein the write data accumulated in the second storage tier are written to the linear media such that at least an integer number of full wraps are written to the linear media in a single pass.

16. The method of claim 14, wherein the at least one mobile robot hangs from an underside of the first surface while moving unconstrained along the first surface.

17. The method of claim 14, wherein the at least one mobile robot is magnetically coupled to the first surface.

18. The method of claim 14, wherein the linear storage media tier includes at least two drives, and wherein read operations are directed to drives not performing write operations.

19. The method of claim 14, wherein the first surface is unpatterned.

20. A computer program product for high density hybrid data storage, said computer program product comprising:
  a computer readable storage medium having stored thereon:
    first program instructions executable by a computer to cause the computer to receive a request to write data;
    second program instructions executable by the computer to cause the computer to determine whether to store the data in a linear storage media tier and/or in a second storage tier having higher performance than the linear storage media tier;
  wherein the linear storage media tier includes:
    a plurality of reels having linear media thereon,
    a rest area for storing the reels when the reels are not in use,
    at least one linear media drive configured for reading and/or writing the linear media, and
    at least one mobile robot for transporting the linear storage media between the rest area and the at least one linear media drive, wherein the robot moves unconstrained along an underside of a first surface, wherein the first surface is a ceiling of the linear storage media tier;
  the computer readable storage medium also having stored thereon:
    third program instructions executable by the computer to cause the computer to instruct the mobile robot to transport one of the reels to a selected linear media drive in the linear storage media tier when the determination is to store the data in the linear storage media tier; and
    fourth program instructions executable by the computer to cause the computer to send the data to the selected linear media drive for writing on the reel.

* * * * *